United States Patent [19]

Nakamura et al.

[11] Patent Number: 5,163,530
[45] Date of Patent: Nov. 17, 1992

[54] CONTROL SYSTEM FOR CONTROLLING DRIVING TORQUE DELIVERED FOR DRIVEN WHEELS

[75] Inventors: Hideo Nakamura; Toshimi Abo; Hiroshi Takahashi; Yoshiki Yasuno; Akira Higashimata; Makoto Kimura, all of Kanagawa, Japan

[73] Assignee: Nissan Motor Company, Limited, Yokohama, Japan

[21] Appl. No.: 626,056

[22] Filed: Dec. 11, 1990

[30] Foreign Application Priority Data

| Dec. 11, 1989 | [JP] | Japan | 1-319026 |
| Dec. 13, 1989 | [JP] | Japan | 1-321323 |
| Feb. 2, 1990 | [JP] | Japan | 2-22237 |

[51] Int. Cl.$^5$ .............................. B60K 28/16
[52] U.S. Cl. .............................. 180/197; 364/426.01
[58] Field of Search ............... 180/197, 249, 338; 364/424.1, 426.03, 426.01

[56] References Cited

U.S. PATENT DOCUMENTS

| 4,527,105 | 7/1985 | Shiraishi | 318/444 |
| 4,542,325 | 9/1985 | Kobayashi et al. | 318/483 |
| 4,584,508 | 4/1986 | Kobayashi et al. | 318/483 |
| 4,603,316 | 7/1986 | Kobayashi et al. | 340/52 R |
| 4,757,870 | 7/1988 | Torii et al. | 180/197 X |
| 4,811,808 | 3/1989 | Matsumoto et al. | 180/197 |
| 4,884,651 | 12/1989 | Harada et al. | 180/197 |
| 4,888,696 | 12/1989 | Akatsu et al. | |
| 5,002,147 | 3/1991 | Tezuka et al. | 180/197 |
| 5,014,809 | 5/1991 | Matsuda | 180/197 X |
| 5,018,595 | 5/1991 | Hara et al. | 180/197 |
| 5,046,009 | 9/1991 | Abo et al. | 180/197 X |
| 5,048,533 | 9/1991 | Takehara et al. | 180/197 |

FOREIGN PATENT DOCUMENTS

| 3127302 | 1/1983 | Fed. Rep. of Germany . |
| 3705983 | 9/1987 | Fed. Rep. of Germany . |
| 3710891 | 10/1987 | Fed. Rep. of Germany . |
| 3711913 | 10/1988 | Fed. Rep. of Germany . |
| 3741248 | 6/1989 | Fed. Rep. of Germany . |

OTHER PUBLICATIONS

Service Weekly Report Nissan Sarfar Y60 Model introduction—published Oct. 1987.

Primary Examiner—Kenneth R. Rice
Assistant Examiner—Kevin Hurley
Attorney, Agent, or Firm—Foley & Lardner

[57] ABSTRACT

A control system for an automotive vehicle controls driving torque delivery for driven wheels. The control system basically controls an output torque of an automotive internal combustion engine toward a target engine output torque which is derived on the basis of an accelerator operational magnitude. The target engine output torque can be modified according to associated conditions, such as road friction level, a characteristic of a power train including a torque converter and a power transmission. The control system also performs selection of engine output control and transmission shift control depending upon vehicle driving condition.

16 Claims, 24 Drawing Sheets

FIG. 7
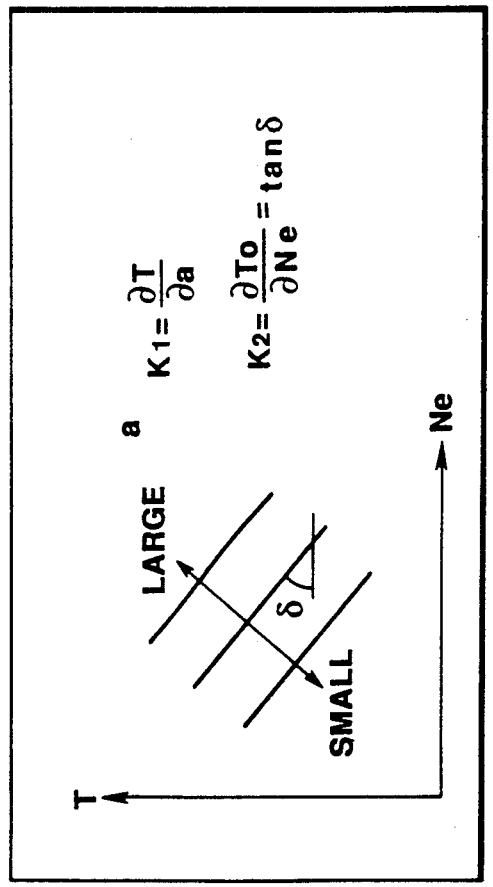
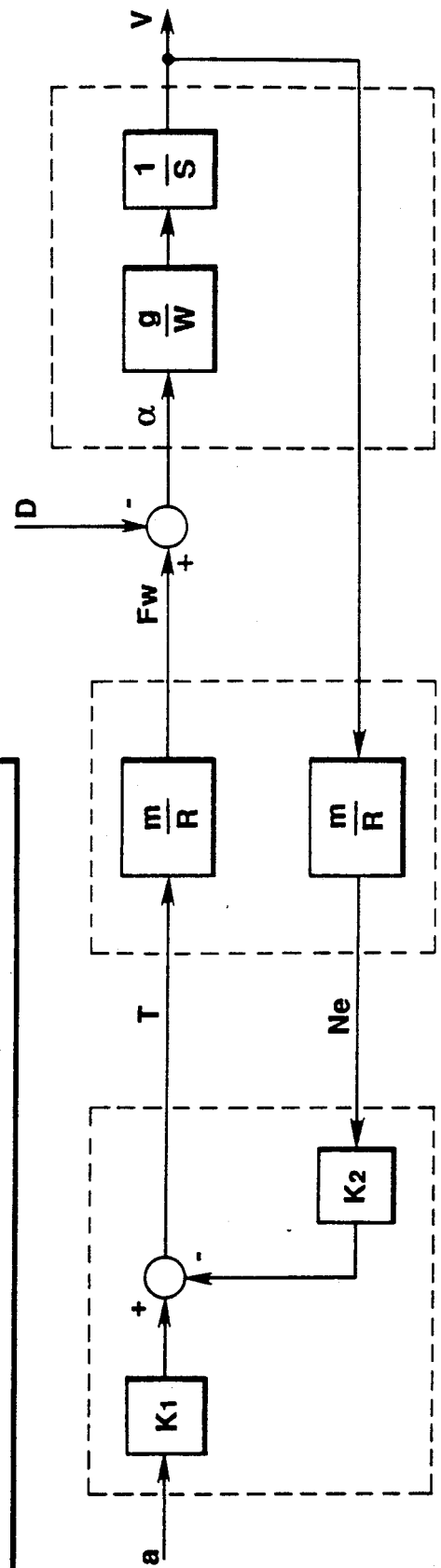

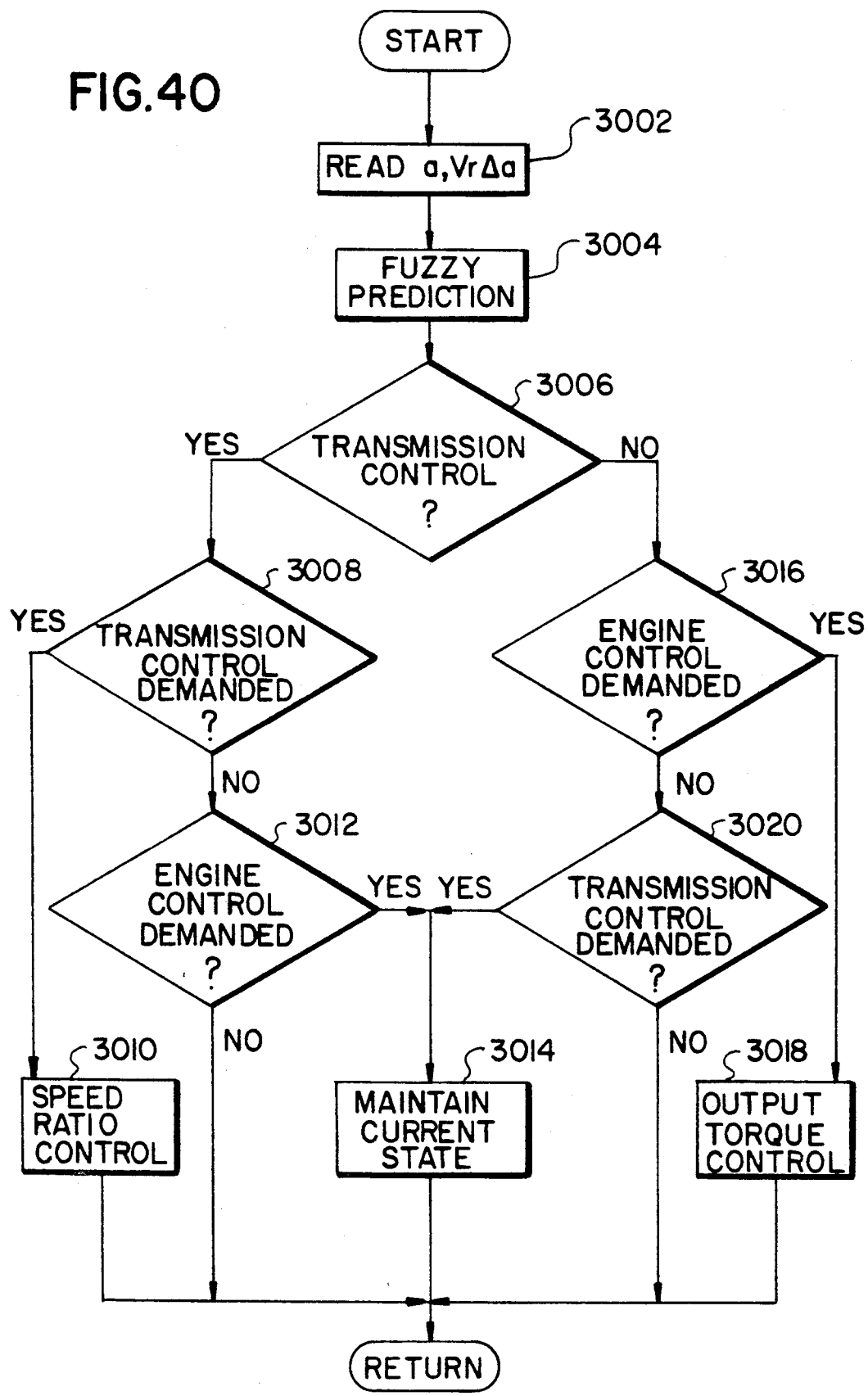

CONTROL SYSTEM FOR CONTROLLING DRIVING TORQUE DELIVERED FOR DRIVEN WHEELS

BACKGROUND OF THE INVENTION

1. Field of the Invention

The present invention relates generally to a control system for controlling delivery of driving torque for an automotive vehicle. More specifically, the invention relates to a control system for the magnitude of driving torque to be delivered to driven wheels for optimizing vehicular driving performance. Further particularly, the invention relates to a control system for controlling driving torque primarily depending upon a torque demand to be delivered to driven wheels.

2. Description of the Background Art

Japanese Patent First (unexamined) Publication (Tokkai) Showa 60-192843 discloses a control system for adjusting driving torque generated in response to operation of an accelerator pedal. The disclosed system adjusts a throttle valve open angle toward a set angle on the basis of the operational magnitude of the accelerator and an engine revolution speed. On the other hand, Japanese Utility Model First (unexamined) Publication (Jikkai) Showa 62-193151 discloses a similar control for a Diesel engine, in which a governer is controlled instead of the throttle valve. Furthermore, Japanese Patent First Publication (Tokkai) Showa 63-25355 discloses adjustment of the engine output depending upon the vehicle driving condition so as to establish desired driving performance.

In the foregoing or other prior proposed engine control systems, the engine output torque is controlled toward a target torque set according to an operational magnitude of an accelerator pedal. In the practice, the target torque set in relation to the operational magnitude of the accelerator pedal is adjusted in view of possible maximum torque (hereafter referred to as "critical torque") depending upon road/tire slippage in feedback manner. When the control system is established for performing engine output control based on the engine output torque to be generated corresponding to the operational magnitude of the accelerator pedal, however the driving torque to be delivered to the driven wheel tends to become excessive, particularly on a relatively low friction road. Therefore, it becomes necessary to provide a separate traction control system.

In general, the automative internal combustion engine is connected to the driven wheels via a power train including an automatic power transmission or automatic transaxle incorporating a torque converter. In such case, the driving torque to be delivered to the driven wheel cannot be precisely controlled solely by controlling the engine output torque because of slippage at the torque converter. Furthermore, response characteristics of driving torque delivery are determined depending not only upon the engine characteristics but also upon responsive characteristics of the automatic power transmission or the automatic transaxle.

SUMMARY OF THE INVENTION

Therefore, it is an object of the present invention to provide a control system for controlling driving torque delivery primarily based on a torque demand while maintaining wheel slippage at an acceptable magnitude.

Another object of the invention is to provide a control system which can adjust an output torque of an internal combustion engine in relation to a demand for delivery of the driving torque for the driven wheels while taking into consideration the characteristics of a power train associated with the engine.

In order to accomplish the aforementioned and other objects, a control system, according to the present invention, for an automotive vehicle controls driving torque delivery for driven wheels. The control system basically controls an output torque of an automotive internal combustion engine toward a target engine output torque which is derived on the basis of an accelerator operational magnitude. The target engine output torque can be modified according to associated conditions, such as road friction level, and characteristics of a power train including a torque converter and a power transmission. The control system also performs selection of engine output control and transmission shift control depending upon vehicle driving conditions.

According to one aspect of the invention, a control system for controlling distribution of a driving torque for driven wheels comprises:

first means for manually entering a torque demand for the driving torque to be distributed of the driven wheels for controlling vehicular traveling behavior, the first means generating torque demand indicative signal;

second means for monitoring an engine revolution speed for producing an engine speed indicative signal;

third means for deriving a target engine output torque on the basis of the torque demand indicative signal and the engine speed indicative signal;

fourth means for detecting a vehicle driving condition based on a preselected vehicle driving parameter which affects a conversion of the engine output torque into thrust force for propelling the vehicle to travel, for deriving a correction factor for the target engine output torque, and modifying the target engine output torque on the basis of the correction factor; and fifth means for controlling an engine driving condition for adjusting the engine speed for generating an engine output torque coincident with the modified target engine output torque.

In the preferred construction, the fourth means monitors wheel slippage and derives the correction factor which represents a maximum driving torque applicable for driven wheel for driving the wheel while maintaining wheel slippage within a predetermined acceptable range. The fourth means may include a wheel speed sensor for monitoring wheel speed of the driven wheel, a wheel torque sensor for monitoring driving torque at the driven wheel, a vehicle speed sensor for monitoring vehicular traveling speed, means for deriving angular acceleration of the wheel on the basis of monitored wheel speed of the driven wheel, means for deriving a dynamic friction coefficient on the basis of the driving torque on the driven wheel and the angular acceleration at the driven wheel, and a wheel slippage based on the vehicle speed and the wheel speed of the driven wheel. Furthermore, the fourth means may further comprise means for deriving a maximum dynamic friction on the basis of dynamic friction at each driven wheel and the wheel slippage at each driven wheel, and means for deriving a limit of driving torque to be distributed for each driven wheel as the correction factor on the basis of the maximum dynamic friction. In addition, the fourth means may monitor status of a power train for transmitting the engine output torque to the driven wheel for deriving a driving torque transmission characteristic, the fourth means deriving a target driving torque to be distributed to the driven wheel and deriving a ratio between the engine output torque and the driving torque distributed to the driven wheel as the correction factor for modifying the target engine output torque so that the driving torque to be distributed to the driven wheel is controlled to the target driving torque. In such case, the fourth means may detect a transmission speed ratio and an input/output speed ratio at a torque converter for deriving the ratio of the engine output torque and the driving torque.

Further preferably, the control system may further comprise a sixth means for setting engine response characteristics depending upon vehicle driving condition for adjusting engine speed variation ratio there along. In such case, the sixth means may monitor one of vehicular steering condition, rain condition, vehicular load condition, load on the driven wheel and gradient of the road for setting the engine response characteristics depending thereon.

In the alternative, the control system may comprise a sixth means for controlling a speed ratio of an automotive automatic power transmission, and a seventh means for monitoring a vehicle driving condition for selectively initiating the engine output torque control and the transmission speed ratio control dependent upon the vehicle driving condition. In such case, the seventh means may predict demand for vehicular behavior based on the vehicle driving condition for selecting one of the engine output torque control and the transmission speed ratio control having greater demand. Preferably, the seventh means may derive an assurance level representative data for predicting magnitude of demand for the engine output torque control and the transmission speed ration control, which assurance level representative data is derived on the basis of the vehicle driving condition, and the seventh means selects one of the engine output torque control and the transmission speed ratio control having greater assurance level indicative data. In such case, the sixth means may monitor at least one of an accelerator operational magnitude, an average vehicle speed, a vehicle traveling resistance, a vehicular steering condition, or a braking frequency.

BRIEF DESCRIPTION OF THE DRAWINGS

The present invention will be understood more fully from the detailed description given here below and from the accompanying drawings of the preferred embodiment of the invention, which, however, should not be taken to limit the invention but are for explanation and understanding only.

In the drawings:

FIG. 7 is a schematic block diagram showing process of operation to be implemented by the first embodiment of the control system;

FIG. 40 is a flowchart showing a routine for selectively controlling an engine or a transmission.

DESCRIPTION OF THE PREFERRED EMBODIMENT

Figure 1:
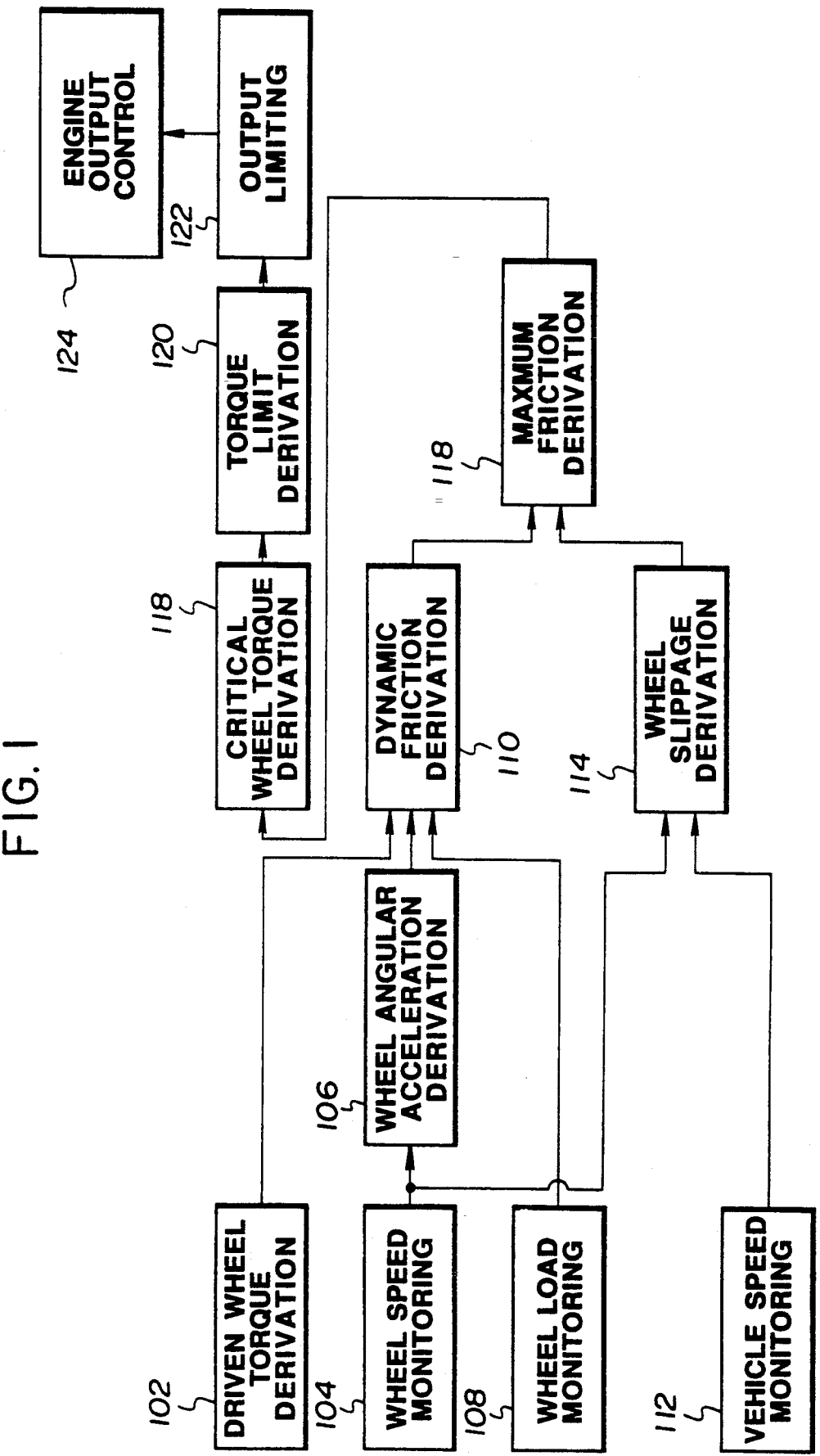
FIG. 1 is a schematic block diagram of the first embodiment of a driving torque delivery control system according to the invention, which is illustrated in a discrete manner of functions to be implemented.

Referring now to the drawings, particularly to FIG. 1, the first embodiment of a driving torque delivery control system for an automotive vehicle is illustrated in a form of discrete circuit, in which respective blocks represents functions associated with the control operation to be performed. The driving torque delivery control system of the first embodiment includes a driving wheel torque derivation stage 102, in which a driving torque generated at driven wheels is derived on the basis of an output torque of an internal combustion engine. The control system also has a wheel speed monitoring stage 104 for monitoring rotation speed of respective driven wheels. The wheel speed monitoring stage 104 generates wheel speed indicative data representative of the monitored rotation speed of the driven wheels. The wheel speed indicative data is fed to a wheel angular acceleration derivation stage 106. In the wheel angular acceleration derivation stage 106, the wheel speed indicative data is processed for deriving a wheel angular acceleration indicative data. A wheel load monitoring stage 108 is provided for monitoring load on respective driven wheel. The driven wheel torque data generated by the driven wheel torque derivation stage 102, the wheel angular acceleration indicative data from the wheel angular acceleration derivation stage 106 and the wheel load indicative data from the wheel load derivation stage 108 are supplied to a dynamic friction derivation stage 110. The data are processed in the dynamic friction derivation stage 110 for deriving a dynamic friction between the driven wheels and the road surface. A vehicle speed monitoring stage 112 is also provided for monitoring vehicular body traveling speed to generate a vehicle speed representative data. The vehicle speed representative data is fed to a wheel slippage derivation stage 114 together with a wheel speed indicative data from the wheel speed monitoring stage 104. At the wheel slippage derivation stage 114, a wheel slippage representative data is generated on the basis of the vehicle speed representative data and the wheel speed representative data with respect to each of the driven wheels. The wheel slippage representative data and the dynamic friction indicative data from the dynamic friction derivation stage 110 are fed to a maximum friction derivation stage 116. A maximum friction is derived in the maximum friction derivation stage 116 on the basis of the dynamic friction indicative data and the wheel slippage representative data. In view of the maximum friction indicate data derived in the maximum friction derivation stage 116, a critical torque representing a maximum driving torque which can be loaded on each driven wheel for optimally driving them without causing unacceptable magnitude of wheel slippage, at a critical torque derivation stage 118. A critical torque indicative data is thus generated in the critical torque derivation stages 118 and supplied to a torque limit derivation stage 120. In the torque limit derivation state 120, a torque limit indicative data is generated in view of the critical torque represented by the critical torque indicative data which represents upper limit of an output torque of the internal combustion engine. Practically, the torque limit indicative data is derived by selecting minimum value of the critical torque for respective driven wheels and by multiplying the selected minimum value of the critical torque by a number of driven wheels for which the engine output torque is distributed. Based on the torque limit indicative data from the torque limit derivation stage 120, an engine output limit data is derived at an output limiting stage 122. The engine output limit data is supplied to an engine output control stage 124 for controlling engine operation in order to control the engine output in a range lower than the output limit defined by the engine output limit data.

In general, the shown embodiment of the control system derives a target output torque of the internal combustion engine on the basis of an accelerator operational magnitude or accelerator position and the engine speed. In order to achieve the target output torque, a fuel supply amount, e.g. fuel injection amount and an intake air flow rate or throttle valve open angle, are controlled. Practical construction of the control system, implementing the first embodiment is illustrated in FIG. 2.

Figure 2:
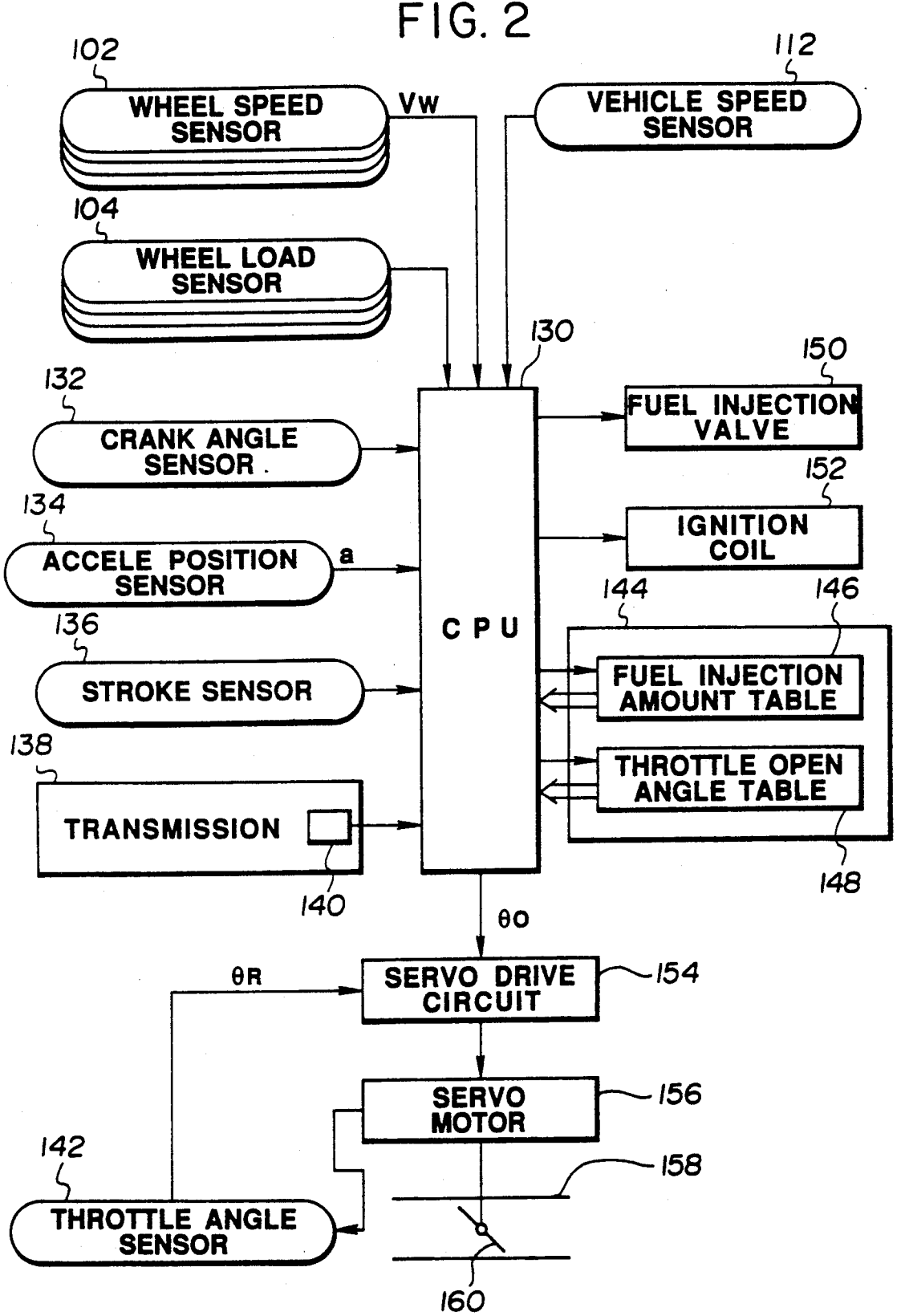
FIG. 2 is a block diagram of the first embodiment of the driving torque delivery control system showing the first preferred construction of control system.

In the control system illustrated in FIG. 2, a wheel speed sensors 102 forming the foregoing wheel speed monitoring stage are provided for monitoring rotational speed of respective vehicular wheels including driven wheels which is driven by the engine output torque and non-driven wheels which are not connected to the engine and thus are placed for free rotation according to vehicular travel. In case of the vehicle which has four wheel drive power train layout, all wheels are taken as driven wheels. The wheel speed sensors 102 produces wheel speed indicative signals $V_{FL}$, $V_{FR}$, $V_{RL}$ and $V_{RR}$ respectively representative of the rotation speed of the associated wheels. The wheel speed indicative signal as generally referred to may be represented by "Vij". Wheel load sensors 104 forming the wheel load monitoring stage, are also provided for respective vehicular wheels for monitoring wheel load on each of the wheels for generating wheel load indicative signals $W_{FL}$, $W_{FR}$, $W_{RL}$ and $W_{RR}$. The wheel load as generally referred to may be hereafter represented by "Wij".

The control system also includes a crank angle sensor 132 for monitoring crankshaft angular position to generate crank reference signal and crank position signal. An accelerator position sensor 134 is associated with an accelerator pedal to monitor operational magnitude of the accelerator pedal to produce an accelerator position indicative signal. A stroke sensor 136 is also provided for monitoring relative distance between a vehicular body and a suspension member for generating a suspension stroke indicative signal. A transmission gear position sensor 140 is provided in a power transmission 138 to detect the current gear position or operational range of the power transmission to produce a transmission gear position indicative signal. The foregoing sensors are connected to CPU 130 of a microprocessor, which forms a core of the control system.

CPU 130 processes the input signals to derive a target output torque of the engine, and thus derives a fuel injection amount required for generating the target output torque. Based on the fuel injection amount thus derived. CPU 130 produces a fuel injection pulse having a pulse width corresponding to the fuel injection amount. As is well known, the fuel injection amount is derived by table look-up against a fuel injection amount table 146 stored in a data storage 144 in terms of fuel injection control parameters, e.g. engine speed, engine load and so forth. The fuel injection pulse is supplied to one or more fuel injection valves 150 disposed in an air induction system 158 of the engine to drive the latter to inject the controlled amount of fuel. At the same time, an intake air flow rate is adjusted toward a required rate by controlling the throttle valve open angle toward a target throttle valve open angle. For controlling the throttle valve open angle, the target throttle valve open angle is derived by table look-up against a throttle open angle table 148 in the data storage 144. Based on the target throttle valve open angle thus derived, a servo drive circuit 154 drives a servo motor 156 to adjust the angular position of a throttle valve 160 in the indication system 158. A throttle angle sensor 142 is associated with the servo motor 156 to detect the throttle valve angular position to provide a throttle angle signal $\theta_R$ to the servo drive circuit 154 as a feedback signal. With this arrangement, the servo drive circuit 154 drives the servo motor 156 in feedback manner to precisely adjust the throttle valve open angle to the target value.

Figure 3:
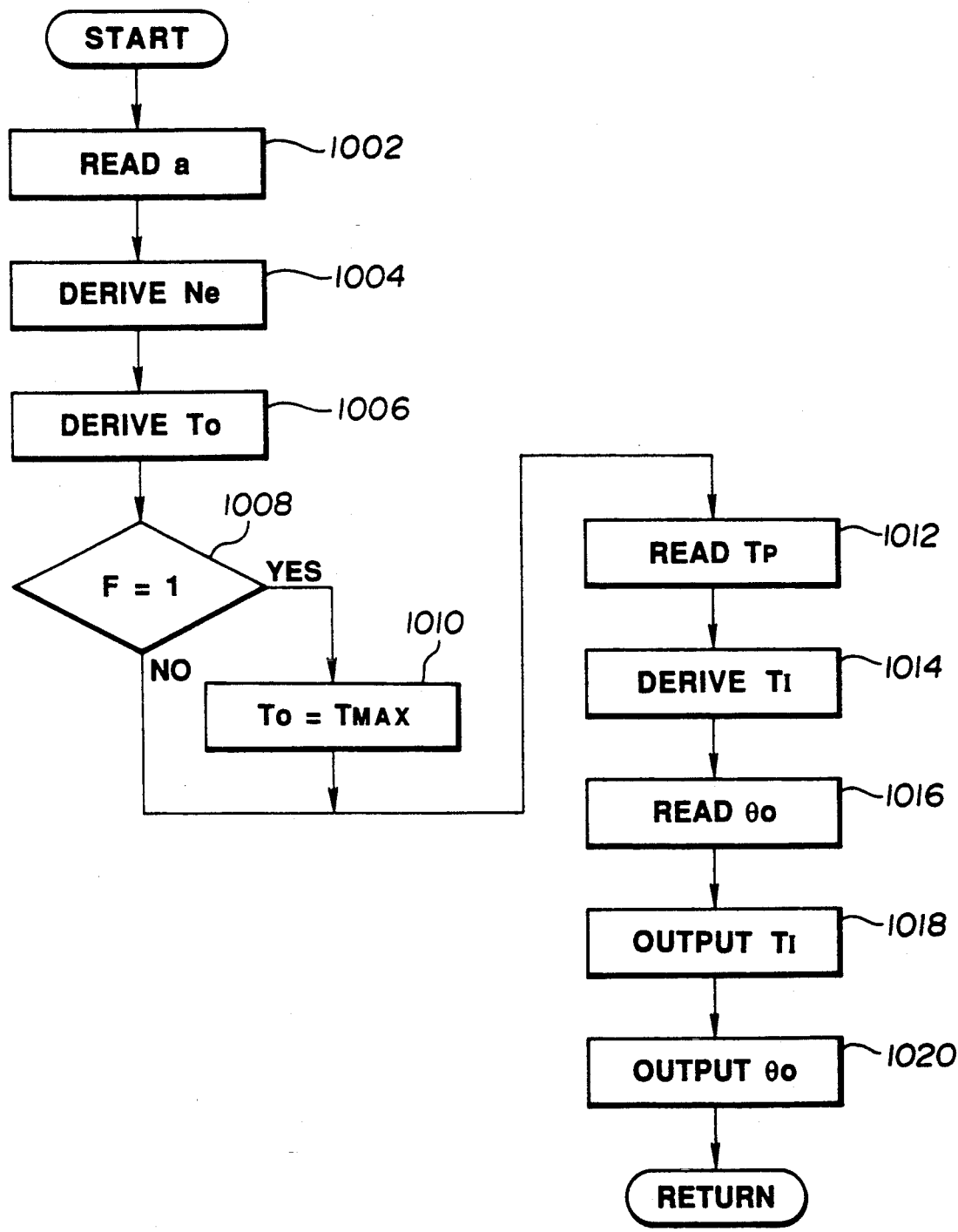
FIGS. 3 and 4 are flowcharts of the processes implemented in the first embodiment of the control system.
Figure 4:
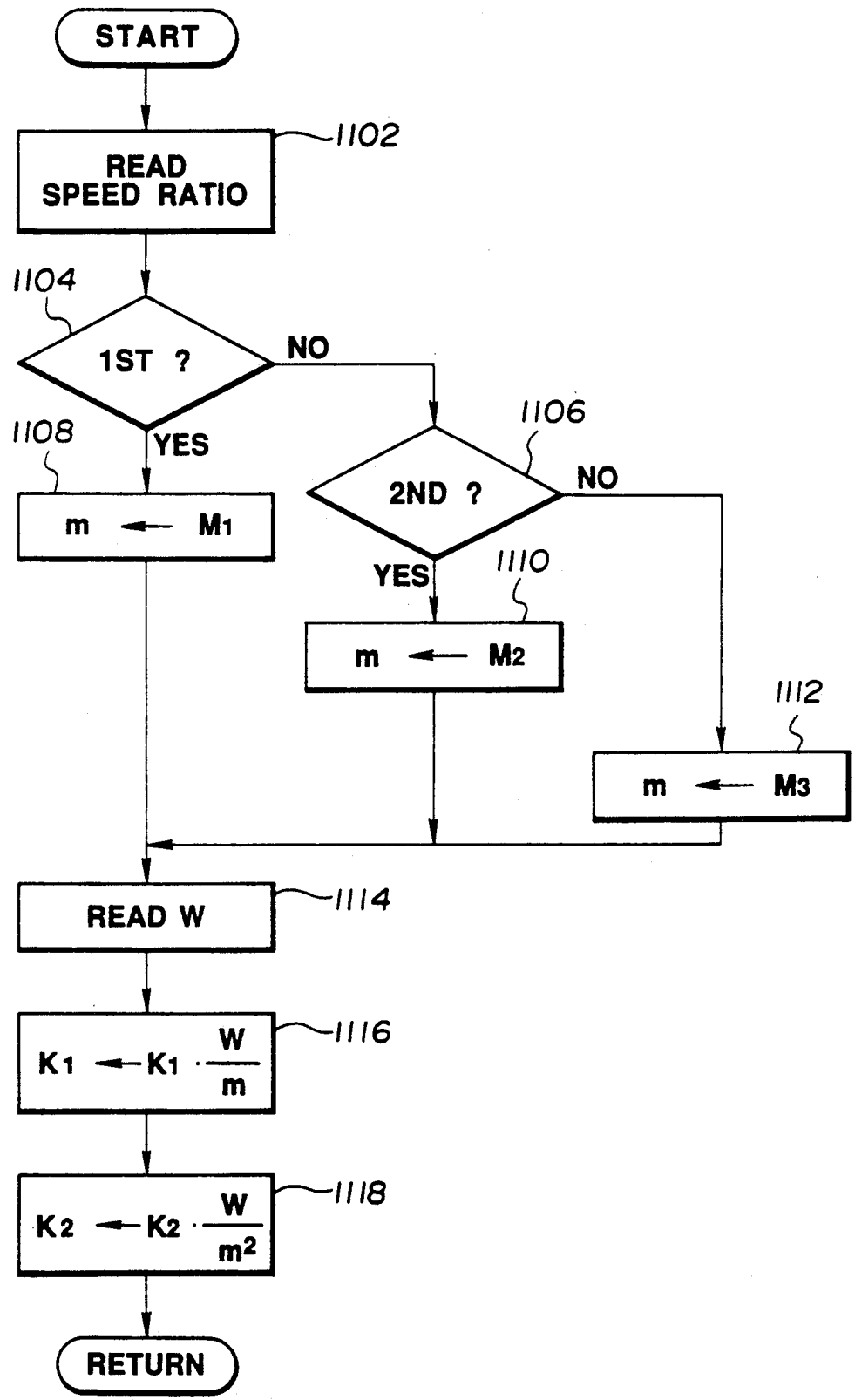

FIGS. 3 and 4 show flowcharts illustrating process of control operation to be executed by the first embodiment of the control system, according to the invention. FIG. 3 shows a routine for deriving a target engine output torque $T_0$, and a fuel injection amount $T_I$ and a target throttle valve open angle $\theta_0$ for achieving the target engine output torque. The shown routine in FIG. 3 is periodically triggered every 10 ms.

At a step 1002, the accelerator position indicative signal a is read out. Subsequently, at a step 1004, an engine speed indicative data Ne is derived on the basis of one of the crank reference signal or crank angle signal in per se known manner. Thereafter, at a step 1006, the target engine output torque $T_0$ is calculated through the following equation:

$$T_0 = k_1 \cdot a - k_2 \cdot Ne \tag{1}$$

wherein $k_1$ and $k_2$ are parameters defining torque output characteristics, in which $k_1$ is a proportional constant for deriving the engine output torque versus the accelerator position data, and $k_2$ is a proportional constant for deriving the engine output torque versus the engine speed. The proportional constants $k_1$ and $k_2$ are derived based on an external load on the output shaft of the engine, which external load is derived on the basis of the vehicular weight and transmission gear ratio.

At a step 1008, a target torque variation demand indicative flag F is checked. If the target torque variation demand indicative flag F as checked at the step 1008 is set, the target engine output torque $T_0$ is set as engine output torque limit $T_{MAX}$ at a step 1010. Detail of the process at the step 1010 will be discussed later.

Figure 5:
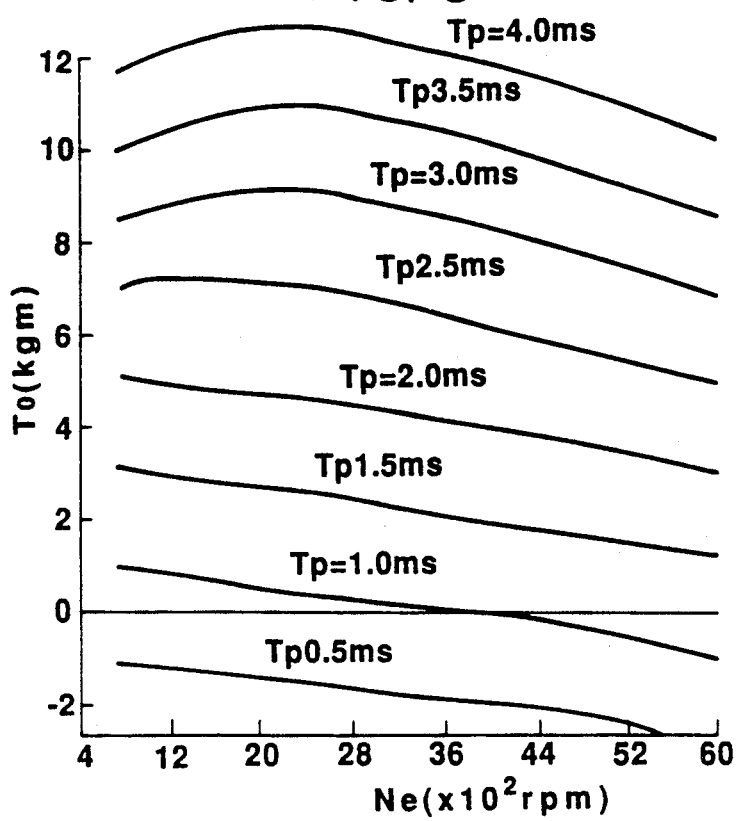
FIG. 5 is a chart showing a fuel injection amount table used in the first embodiment of the control system.
Figure 6:
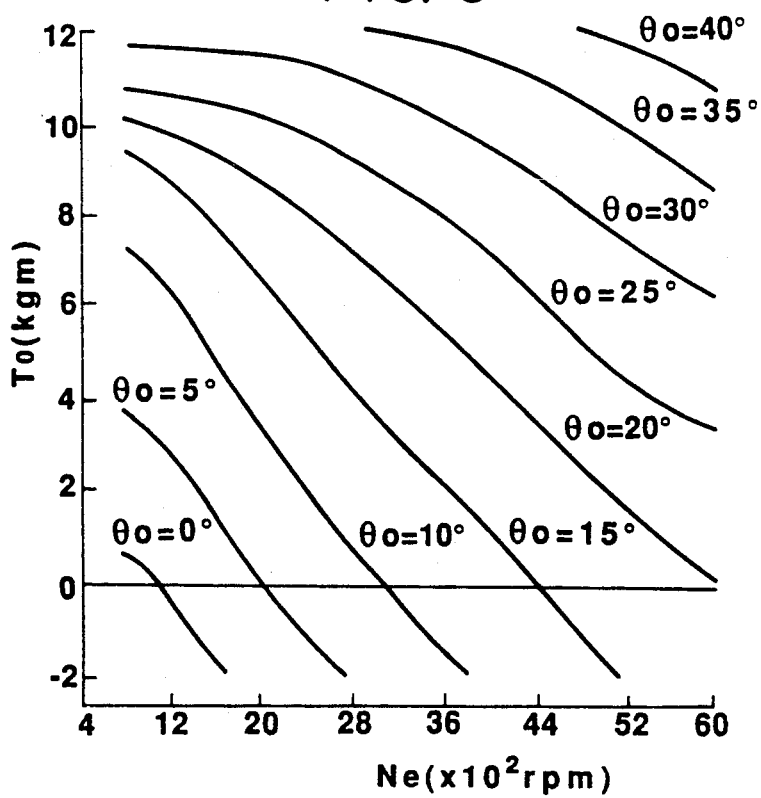
FIG. 6 is a chart showing a throttle open angle table used in the first embodiment of the control system.

At a step 1012, a basic fuel injection amount $T_P$ is derived. As is well known, the basic fuel injection amount $T_P$ is derived on the basis of the target engine output torque $T_0$ and the engine speed indicative data Ne. Derivation on the basis fuel injection amount $T_P$ is performed by table look-up against the fuel injection amount table 146 which is also illustrated in FIG. 5. As can be seen, table look-up at the step 1012 is performed in terms of the target engine output torque $T_0$ and the engine speed Ne. The variation characteristics of the fuel injection basic fuel injection amount $T_P$ is set with respect to the performance and characteristics of the engine. Subsequently, the fuel injection amount $T_I$ is derived with various correction values, e.g., acceleration enrichment coefficient, a cold engine enrichment coefficient, air/fuel ratio dependent feedback correction coefficient, and so forth, at a step 1014. Then, at a step 1016, the target throttle valve open angle $\theta_0$ is derived on the basis of the target engine output torque $T_0$ and the engine speed Ne. In practice, the target throttle valve open angle $\theta_0$ is derived by table look-up against the throttle valve open angle table 148 which is illustrated in FIG. 6. The variation characteristics as set in FIG. 6 may be variable depending upon the engine performance and characteristics.

At a step 1018, the fuel injection amount $T_I$ is output and set in the output port of CPU 130. Therefore, the fuel injection pulse having the pulse width corresponding to the fuel injection amount $T_I$ is injected through the fuel injection valve 150 at a given timing in synchronism with the engine revolution. Subsequently, the target throttle valve open angle $\theta_0$ thus derived is fed to the servo drive circuit 154 at a step 1020. The servo drive circuit 154 thus drives the servo motor 156 to cause angular displacement of the throttle valve 160 toward the target throttle valve open angle $\theta_0$.

FIG. 4 shows a routine for deriving torque output characteristics of the engine. Since the shown routine does not require high speed data processing as that required for the routine of FIG. 3, the shown routine may be executed every occurrence of transmission gear shifting or in the processing of the background job.

At a step 1102, the transmission gear position or the transmission speed ratio indicative data from the transmission gear position sensor 140 is read out. Then, at steps 1104 and 1106, the checks are performed whether the current gear position is at first speed range or second range. If the transmission gear position as checked at the step 1104, the gear ratio data $M_1$ for the first speed range is read out from the data storage 144 and set as gear ratio data register m, at a step. On the other hand, when the current transmission gear ratio as checked at the step 1106, the gear ratio data $M_2$ for the second speed range is read out from the data storage 144 and set at the gear ratio data register m at a step 1110. If the current transmission gear ratio as checked at the step 1106 is not the second speed range, the gear ratio data for third speed range $M_3$ is read out and set at the gear ratio data register m at a step 1112.

Then, at a step 1114, the vehicular weight W is derived on the basis of the suspension stroke indicative signal of the stroke sensor 136. In practice, the vehicular weight W can be calculated through the following equation:

$$W = W_0 + L/k \tag{2}$$

wherein

L is a lowering stroke of the vehicular body from the neutral height position; and k is spring coefficient of the suspension.

Then, at a step 1116, a proportional constant $k_1$ defining output torque characteristics versus the accelerator position is derived on the basis of the vehicular weight W and the gear ratio data m. In practice, the proportional constant $k_1$ is derived through the following equation:

$$k_1 = K_1 \cdot W/m \tag{3}$$

Then, at a step 1118, proportional constant $k_2$ defining output torque characteristics versus the engine speed Ne is derived on the basis of the vehicular weight W and the gear ratio data m. In practice, the proportional constant $k_2$ is derived through the following equation:

$$k_2 = K_2 \cdot W/m^2 \tag{4}$$

wherein $K_1$ and $K_2$ are experimentally obtained constant for optimal vehicular driving feeling.

Operation of the engine output torque control will be discussed with reference to FIG. 7, in which operation of the first embodiment of the control system is illustrated in discrete manner. FIG. 7 illustrates a model showing vehicular activity with neglecting power loss at the engine and the power train. In the shown model, relationship between variation magnitude a of accelerator position and a vehicular body acceleration α can be illustrated by the following equation:

$$\alpha = \frac{S \cdot G_1}{S + G_2} \cdot - \frac{G_3}{S + G_2} \cdot D \quad (5)$$

where D is traveling resistance, S is Laplace operator, and $G_1$ to $G_3$ are gains.

In the foregoing equation (5), first element of right side represents response characteristics of vehicular body acceleration $\alpha$ versus the accelerator position a. On the other hand, the second element of right side of the equation (5) represents response characteristics of vehicular body acceleration relative to the vehicular traveling resistance D. These factors determines the vehicular driving feeling.

Gains $G_1$ to $G_3$ can be derived from the following equations:

$$G_1 = k_1 \cdot (m/R) \cdot (g/W) \quad (6)$$

$$G_2 = k_2 \cdot (m/R)^2 \cdot (g/W) \quad (7)$$

$$G_3 = g/W \quad (8)$$

where R is effective radius of a tire, g is a gravitical acceleration.

If throttle open angle variation ratio versus variation of the accelerator position, $k_1$ in the foregoing equation is varied. When $k_1$ is set at greater value, variation ratio of vehicular acceleration $\alpha$ versus variation of the accelerator position becomes greater to make the gain $G_1$ greater. In such case, more powerful vehicular drive feeling can be obtained. On the other hand, if the gain $G_2$ is set at greater value, differentiating effect to amplify fluctuation is arisen to degrade drivability of the vehicle. As can be seen from the foregoing equation (7), the $k_2$ associated with the gain $G_2$ corresponds to gradient tang $\delta$ of torque curve in FIG. 7. In case that the throttle valve open angle is controlled solely depending upon the accelerator position, $k_2$ becomes unique characteristics of the specific engine and cannot be set randomly.

In the shown embodiment, since the target engine output torque is determined in terms of the accelerator position and the engine speed, it becomes possible to set the value of $k_2$ at desired value. As can be appreciated, there exist optimal values of $G_1$ and $G_2$ for optimal drive feeling. These optimal values may be determined through experiments by adjusting $k_1$, $k_2$ and m.

On the other hand, if the values $k_1$ and $k_2$ cannot be adjusted depending upon external load, such as vehicular weight W and gear ratio m, the gains $G_1$ and $G_2$ cannot be maintained at values for obtaining optimal drive feeling when vehicular weight and/or transmission gear ratio changes. For instance, at low gear ratio to increase the gear ratio m to vary the gain $G_2$ by square of the m. Therefore, vehicular jerking can be caused. Similarly, the vehicular weight W can affect for the gains $G_1$ and $G_2$.

Assuming that gear ratio data is $m_0$, the vehicular weight is $W_0$, and optima values of $k_1$ and $k_2$ are respectively $k_{10}$ and $k_{20}$, the gains can be derived through the following equations:

$$G_1 = k_{10} \cdot (m_0/R) \cdot (g/W_0) \quad (9)$$

$$G_2 = k_{20} \cdot (m_0/R)^2 \cdot (g/W_0) \quad (10)$$

Here, further assuming that the gear ratio m and the vehicular weight W varies $k_1$ and $k_2$ can be expressed by:

$$k_1 = k_{10} \cdot (m_0/W_0) \cdot W/m = K_1 \cdot W/m \quad (11)$$

$$k_2 = k_{20} \cdot (m_0^2/W_0) \cdot (W/m^2) = K_2 \cdot W/m^2 \quad (12)$$

As can be clear herefrom, by setting $k_1$ and $k_2$ in relation to m and W, the gains $G_1$ and $G_2$ can be optimal values as shown in the foregoing equations (9) and (10).

As can be appreciated from the foregoing discussion, the shown embodiment can control the fuel injection amount and the intake air flow rate depending upon the target torque, constantly. Therefore, according to the shown embodiment, by controlling the target engine output torque, optimal vehicle drive feeling can be achieved.

Though the shown embodiment controls the intake air flow rate based on the target torque by supplying the target throttle open angle $\theta_0$, it may be possible to control the intake air flow rate based on the target throttle valve open angle to control an intake vacuum pressure to a target value.

The shown embodiment further performs a critical torque control. The following discussion will be given for the vehicle having four wheel drive power train layout. In order to perform critical torque control, the wheel speed sensors 102 and the wheel load sensors 104, and the vehicle speed sensor 112 are provided. The wheel speed sensor 102 may comprise a notched rotors and electromagnetic pick-up associated with respective rotors. On the other hand, the vehicle speed sensor 112 may comprises an ultra sonic sensor for monitoring the vehicular body speed utilizing doppler effect.

Figure 8:
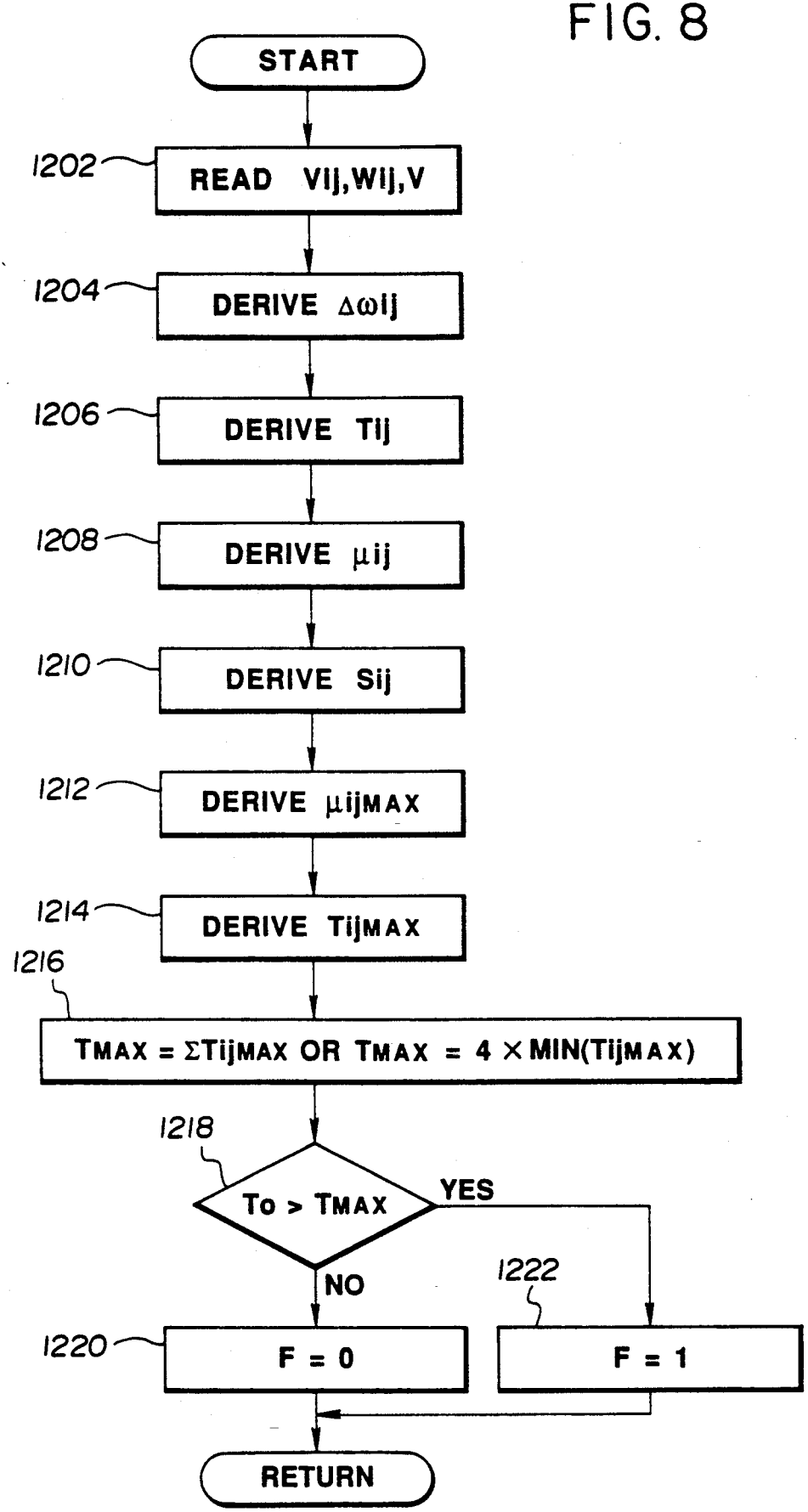
FIG. 8 is a flowchart showing critical torque control to be implemented by the first embodiment of the control system.
Figure 9:
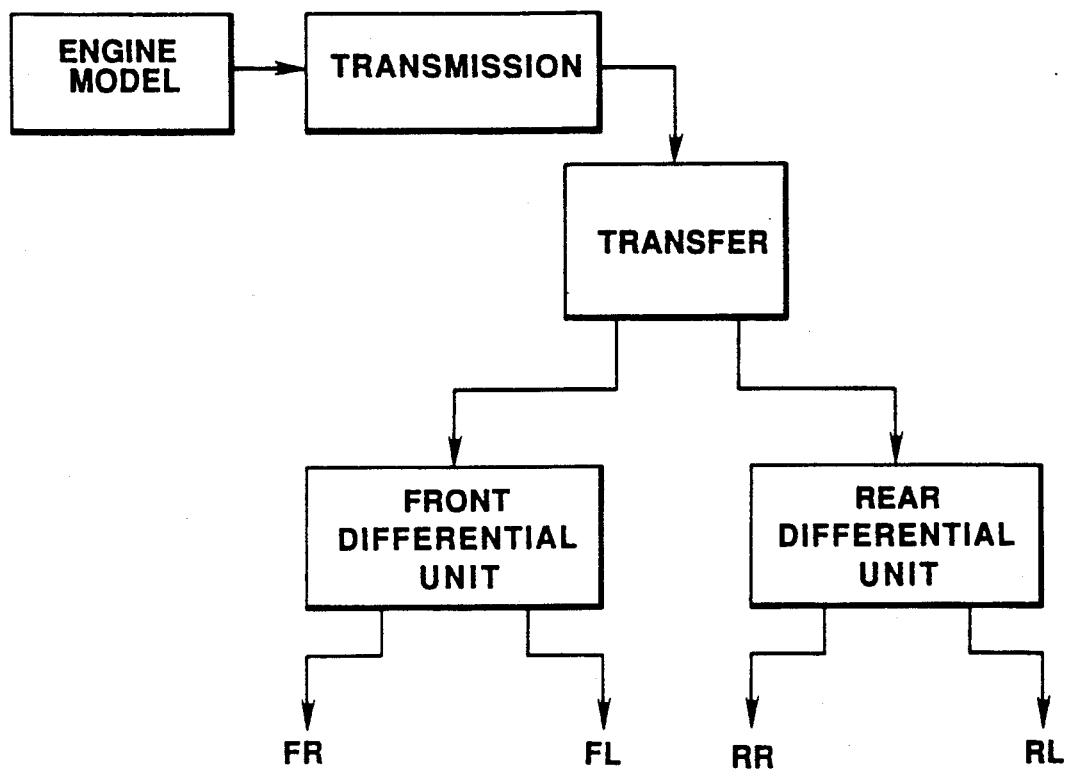
FIG. 9 is a discrete block diagram showing torque distribution and coupling physical model.

FIG. 8 shows a flowchart showing process of critical torque control to be implemented by the shown embodiment of the control system. In this embodiment, at a step 1202, wheel speed indicative signals $V_{ij}$, the wheel load indicative signals $W_{ij}$ and the vehicle speed indicative signal V are read out. Based on the wheel speed indicative signals $V_{ij}$, an angular acceleration $\Delta\omega{ij}$ of driven wheels is derived at a step 1204. At a step 1206, at vehicle start up or when the engine output torque is substantially small, torque distribution and coupling is calculated utilizing physical model of FIG. 9, and subsequently derive a driving torque Tij at the driven wheel is derived on the basis of the target engine output torque $T_0$. Thereafter, at a step 1208, dynamic friction $\mu{ij}$ between the driven wheel and the road surface is calculated on the basis of the driven wheel torque Tij, the wheel angular acceleration $\Delta\omega{ij}$ and the wheel load Wij. Namely, assuming that the ideal tire radius is r, and rotational inertia moment of the tire at the rotation center is Iij, the rotational inertia moment can be expressed by:

$$Iij \cdot \Delta\omega{ij} = Tij - \mu{ij} \cdot Wij \cdot r \quad (13)$$

The foregoing equation can be modified to express the dynamic friction $\mu{ij}$ by the following equation:

$$\mu{ij} = (Tij - Iij \cdot \Delta\omega{ij})/(Wij \cdot r) \quad (14)$$

As can be appreciated herefrom, the dynamic friction $\mu{ij}$ can be derived on the basis of the driven wheel torque Tij, the wheel rotational angular acceleration $\Delta\omega{ij}$ and the wheel load Wij.

Figure 10:
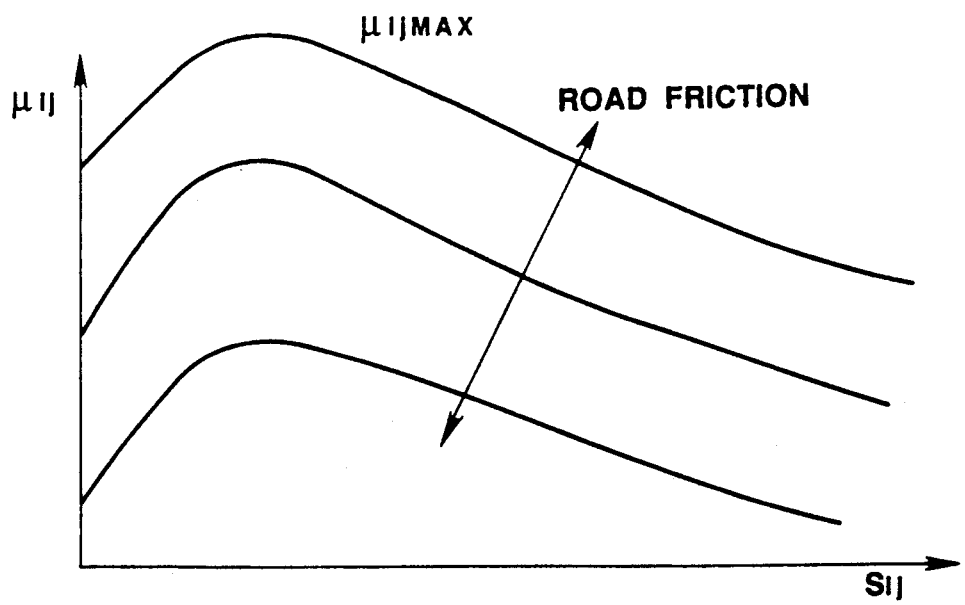
FIG. 10 is a chart showing characteristics used for deriving maximum dynamic friction coefficient.

At a step 1210, wheel slippage Sij is derived on the basis of the vehicle speed V and wheel speeds Vij at the driven wheels. Then, at a step 1212, a maximum dynamic friction $\mu ij_{MAX}$ is predicted in terms of the driven wheel slippage Sij and the dynamic friction $\mu ij$ utilizing the characteristics illustrated in FIG. 10. Then, at a step 1214, the critical torque $Tij_{MAX}$ is then derived at the step 1214. The critical torque $Tij_{MAX}$ represents upper limit of the driven wheel torque criterion to cause unacceptable wheel slippage. Then, the sum $\Sigma Tij_{MAX}$ of the critical torque $Tij_{MAX}$ is derived, at a step 1216. The sum value $\Sigma Tij_{MAX}$ represents an upper limit $T_{MAX}$ of the engine output torque to be generated. In the alternative, the smallest critical torque $MIN(Tij_{MAX})$ is selected as the common critical torque data. The common critical torque data is multiplied by number (4) of the driven wheels to derive the engine output torque limit $T_{MAX}$. The latter process may be useful when the precision level in prediction of the maximum dynamic friction $\mu ij_{MAX}$ is not so high.

Subsequently, at a step 1218, the engine output torque limit $T_{MAX}$ is compared with the target engine output torque $T_0$. When the engine output torque limit $T_{MAX}$ is greater than or equal to the target engine output torque $T_0$, the target torque variation demand indicative flag F is reset at a step 1220. On the other hand, if the engine output torque limit $T_{MAX}$ is smaller than the target engine output torque $T_0$, the target engine torque variation depend indicative flag F is set at a step 1222.

Though the process set forth above, the engine output torque can be adjusted depending upon the friction condition of the road surface.

Figure 11:
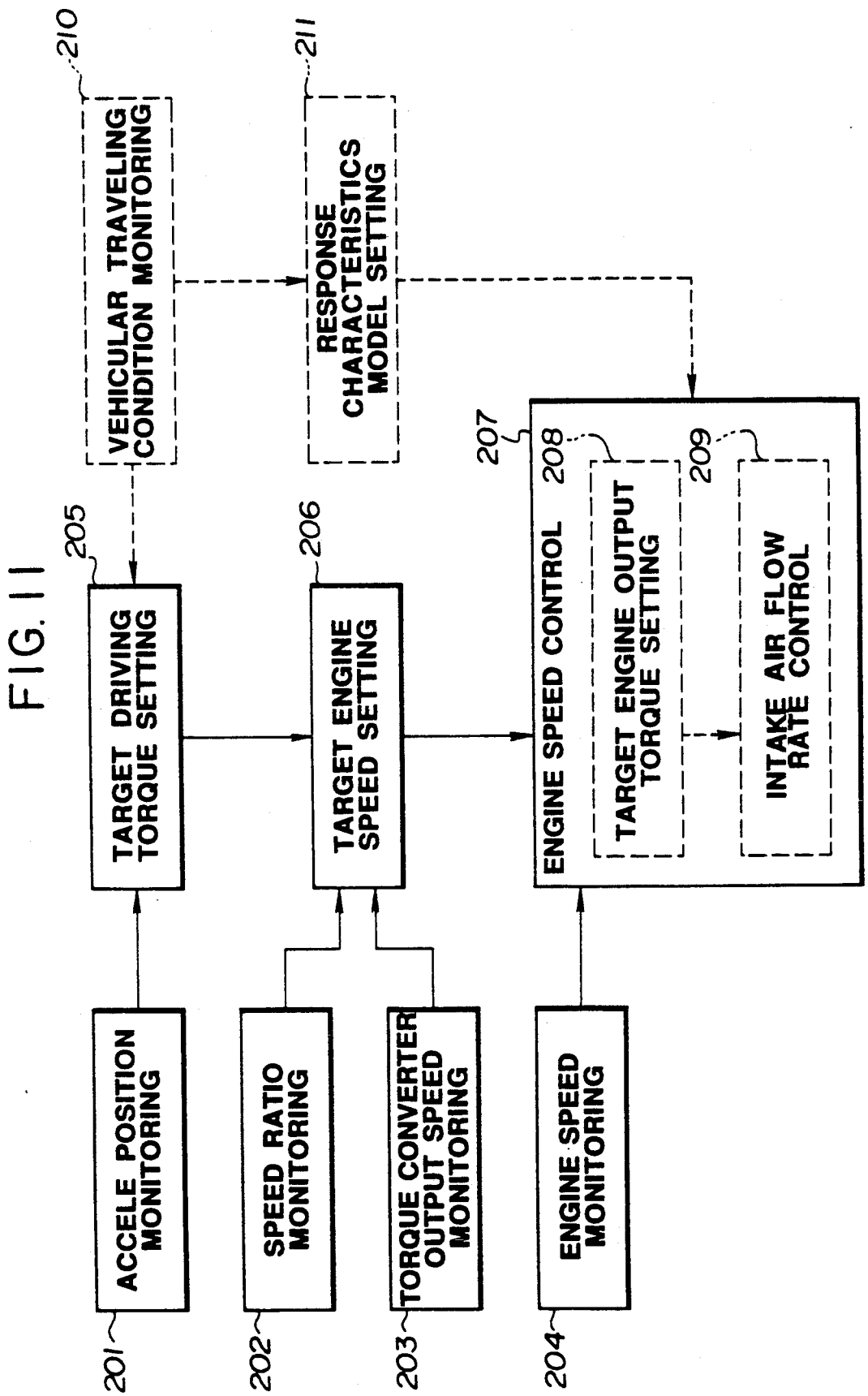
FIG. 11 is a schematic block diagram of second embodiment of a driving torque delivery control system according to the invention, which is illustrated in a discrete manner of functions to be implemented.

FIG. 11 is a schematic and discrete illustration of the second embodiment of a control system for controlling the driving torque delivery, according to the invention. The shown embodiment includes an accelerator position monitoring stage 201, a transmission gear ratio or transmission speed ratio monitoring stage 202, a torque converter output speed monitoring stage 203, and engine speed monitoring stage 204. The accelerator position monitoring stage 201 generates an accelerator position indicative data to be supplied to a target driving torque setting stage 205, in which a target driving torque is set based on the accelerator position represented by the accelerator position indicative data. In addition, the target driving torque setting stage 205 is supplied a vehicular traveling condition indicative data from a vehicular traveling condition monitoring stage 210. On the other hand the transmission speed ratio monitoring stage 202 supplied a transmission speed ratio indicative data to a target engine speed setting stage 206. The torque converter output speed monitoring stage 203 also supplies a torque converter output speed indicative data to the target engine speed setting stage 206. The transmission speed ratio indicative data and the torque converter output speed indicative data are processed in the target engine speed setting stage 206 to set the target engine speed. The vehicular traveling condition monitoring stage 210 further feeds the vehicular traveling condition indicative data to a response characteristics model setting stage 211. The response characteristics setting stage 211 processes the vehicular traveling condition indicative data for setting one of a response characteristics.

An engine speed control stage 207 is connected to the engine speed monitoring stage 204, the target engine speed setting stage 206 and the response characteristics setting stage 211. The engine speed control stage 207 includes a target engine output torque setting stage 208 and an intake air flow rate control stage 209. In practice, the target engine output torque setting stage 208 sets the target engine output torque on the basis of the response characteristics model set in the response characteristics model setting stage 211. Then the target engine torque is set so that the engine speed as monitored by the engine speed monitoring stage 204 can be adjusted toward the target engine speed set in the target engine speed setting stage 206. In order to achieve the target engine output torque set in the target engine output torque setting stage 208, the intake air flow rate is controlled at the intake air flow rate control stage 209.

Figure 12:
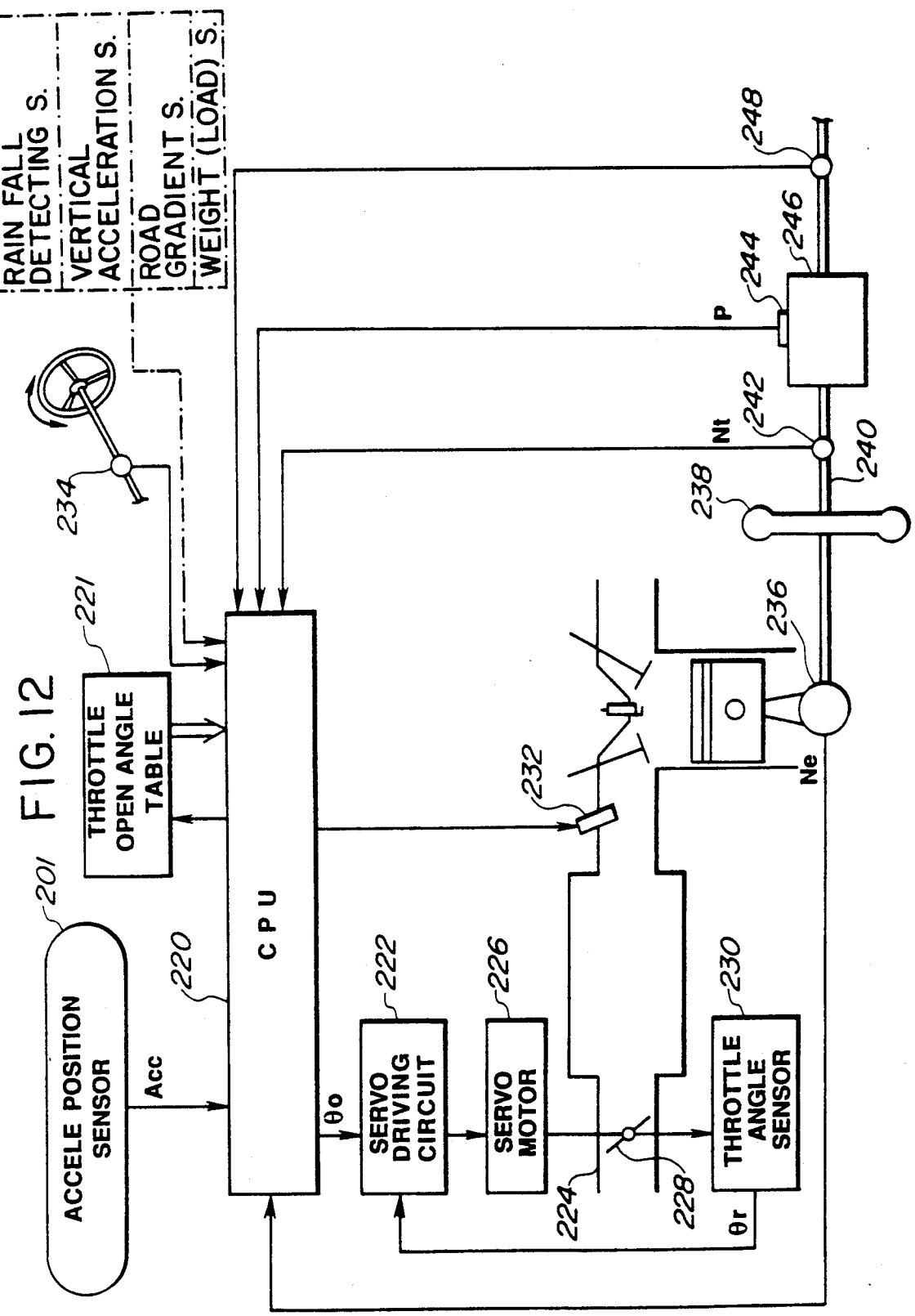
FIG. 12 is a block diagram of the second embodiment of the driving torque delivery control system showing the second preferred construction of control system.

FIG. 12 shows a preferred construction of the control system for implementing the second embodiment of the invention. As can be seen, CPU 220 is connected to an accelerator position sensor 201m a steering angle sensor 234, a torque converter output speed sensor 242 associated with an output shaft 240 of a torque converter 238, a shift position sensor 244 monitoring an automatic power transmission 246 operational range, a vehicle speed sensor 248 associated with a propeller shaft driven by the output of the automatic power transmission. Similarly to the former embodiment, the accelerator position sensor 201 monitors an accelerator pedal position to provide the accelerator position indicative signal Acc. On the other hand, the torque converter output speed sensor 242 monitors the rotation speed of the output shaft 240 of the torque converter 238 to output a torque converter output speed indicative signal $N_t$. The shift position sensor 244 detects the operational range of the automatic power transmission 246 to produce a speed ratio indicative signal P as a data representative of the driving load, such as traveling resistance, speed reduction ratio and so forth. The vehicle speed sensor 248 supplied the vehicle speed indicative signal Vsp, and the steering angle sensor 234 produces a steering angle indicative signal $\alpha$. Although there is not clearly illustrated, CPU 220 further receives magnitude of rain R, hill climbing condition, vehicular load W, wheel load N and so forth. For monitoring such external parameters affecting for engine control may be monitored by a rain sensor, an accelerometer, a suspension stroke sensor and so forth.

CPU 220 processes the input data for deriving a target throttle open angle $\theta_0$ utilizing the throttle open angle table 221. The target throttle open angle indicative signal $\theta_0$ is supplied to the servo drive circuit 222 to drive the servo motor 226 to adjust the throttle valve open angle toward the target throttle valve open angle. The angular position of the throttle valve 228 thus adjusted is monitored by the throttle angle sensor 230 which supplies a throttle angle indicative signal $\theta_r$ to be fed back to the servo drive circuit 222. Therefore, the throttle valve open angle is controlled toward the target throttle valve open angle in feedback manner. CPU 220 further performs fuel injection control for controlling fuel injection amount to be injected through a fuel injection valve 232.

Figure 13:
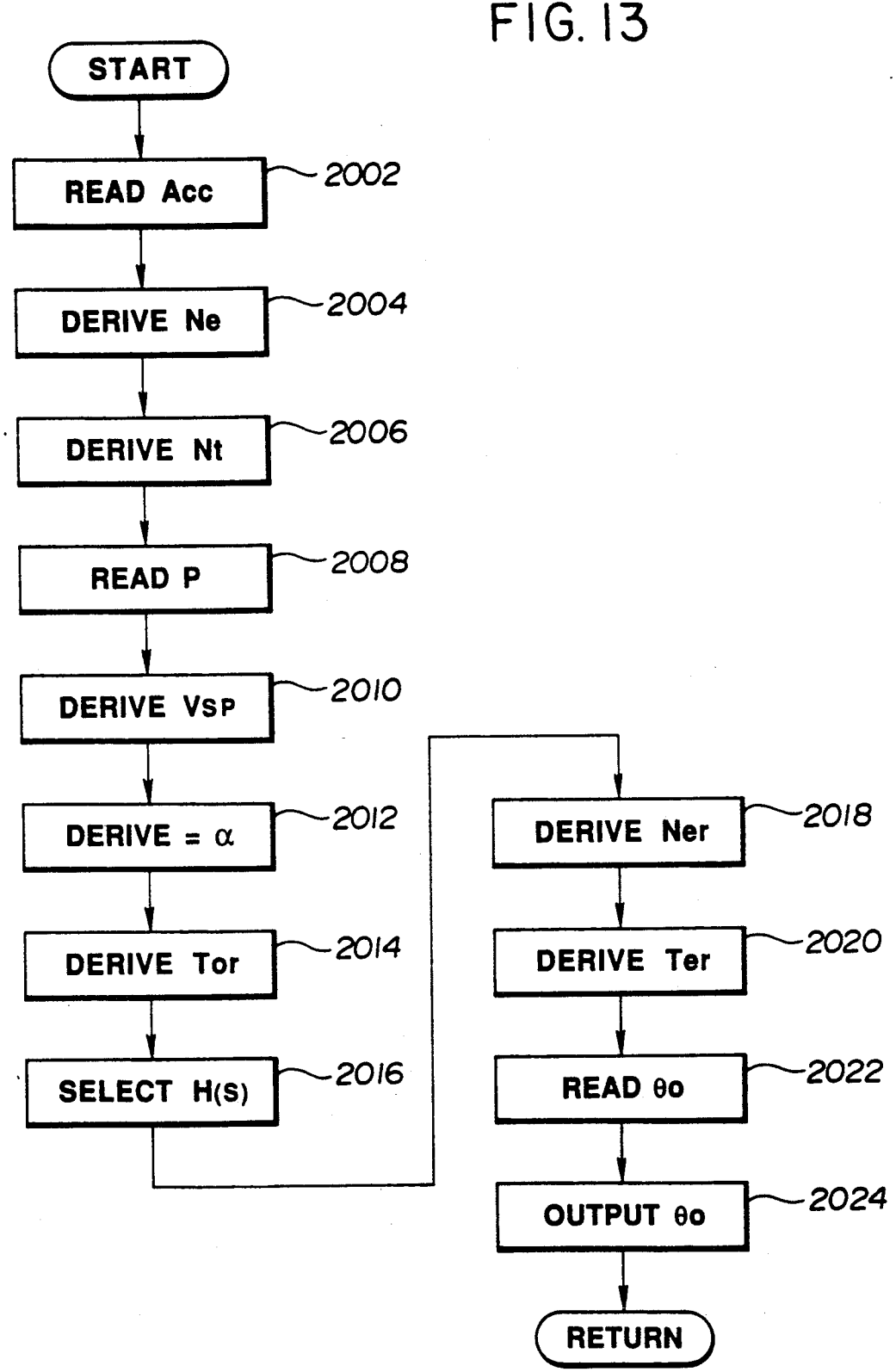
FIG. 13 is a flowchart of the process implemented in the second embodiment of the control system.

FIG. 13 shows the process of control operation to be performed in the second embodiment of the control system according to the invention. The shown process is triggered periodically or cyclically, e.g. every 10 msec. At a step 2002, the accelerator position indicative signal Acc is read out. Then, at a step 2004, an engine speed Ne is derived based on the crank reference signal or crank position signal in a per se well known process. In the similar manner, the torque converter output shaft speed Nt is derived on the basis of pulse train form torque converter output speed indicative signal, at a step 2006. Then, at a step 2008, the speed ratio indicative signal P representative of the power transmission speed ratio is read out. Also, at a step 2010, a vehicle speed Vsp is derived on the basis of the vehicle speed indicative signal, and at a step 2012, a steering angle $\alpha$ is derived base on the steering angle indicative signal.

Figure 14:
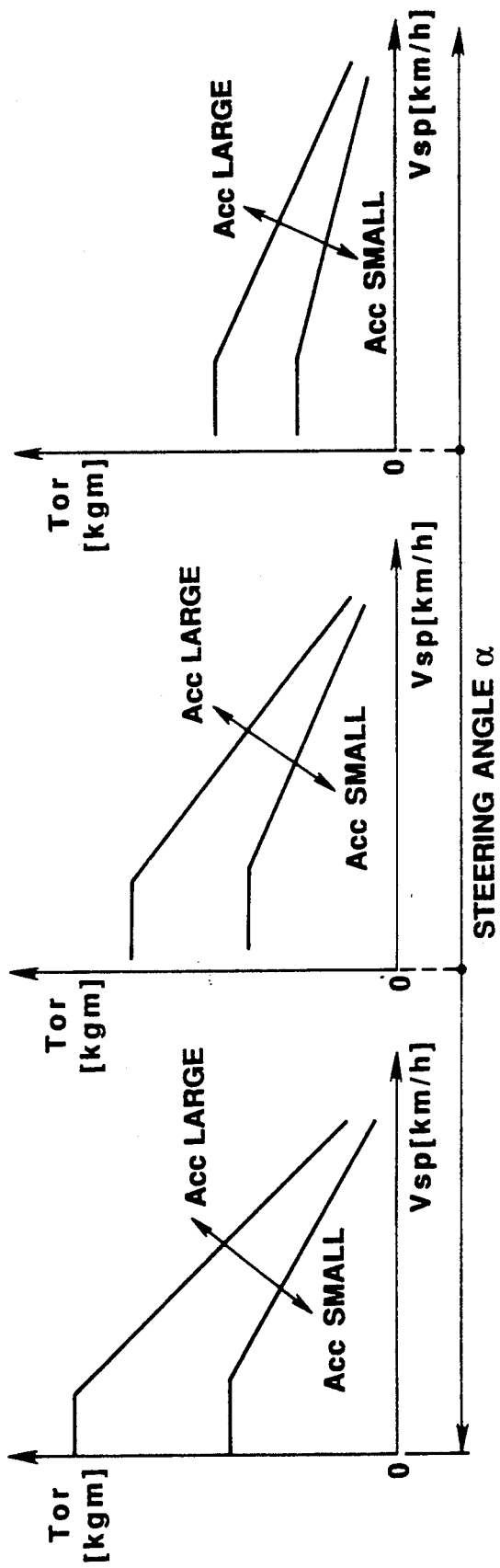
FIG. 14 is a chart showing table data of target driving torque used in the second embodiment of the control system.

At a step 2014, a target driven torque $T_{or}$ is derived. The target engine output torque $T_{or}$ is derived on the basis of the accelerator position Acc and vehicle driving condition represented by the vehicle speed Vsp and the steering angle $\alpha$. As shown in FIG. 14, based on the vehicle speed Vsp and the steering angle $\alpha$, one of a plurality of target engine output torque $T_{or}$ data tables is selected. In practice, the data table is selected in terms of the steering angle $\alpha$. Utilizing the selected table, the target engine output torque $T_{or}$ is derived by table look-up in terms of the vehicle speed Vsp and the steering angle $\alpha$ In the target engine output torque data table is set so that the target engine output torque is set at lower value according to increasing of the vehicle speed Vsp and accelerator operating magnitude Acc. Though the shown embodiment employs the target engine output torque table for deriving the target engine output torque, it is of course possible to arithmetically derive the target engine output torque. In such case, the target engine output torque $T_{or}$ can be derived through the following equation:

$$T_{or} = k_1 \cdot Acc - K_2 \cdot Vsp - k_3 \cdot \alpha \quad (15)$$

Figure 15:
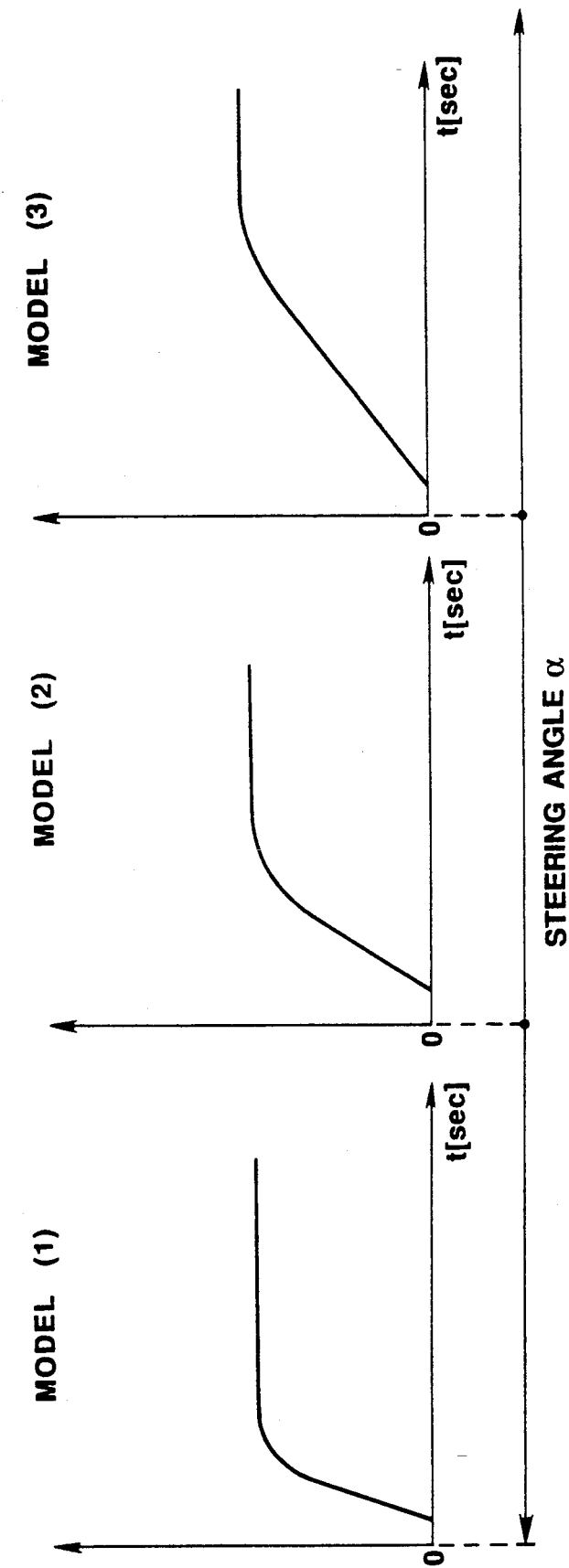
FIG. 15 is a chart showing response characteristic models to be selected in terms of a steering angle.

At a step 2016, response characteristics model $H_{(s)}$ is selected for determining response characteristics in the engine output torque control. In practice, a plurality of response characteristics models are set, as shown in FIG. 15. As can be seen from FIG. 15, one of the response characteristics models is selected in terms of the steering angle $\alpha$. In the shown example, the variation rate of the engine output torque is reduced according to increasing of the steering angle $\alpha$ for moderate variation of the engine output torque. On the other hand, in a range where the steering angle $\alpha$ is small, the variation range of the engine output torque is set at greater value for better response characteristics.

At a step 2018, a target torque converter output torque $T_{er}$ is derived on the basis of the transmission speed ratio Gr corresponding to the shift position P and the target engine output torque $T_{or}$ is derived from the following equation:

$$T_{tr} = T_{or} \div Gr \quad (16)$$

Based on the target torque converter output torque $T_{tr}$ and the torque converter output speed Nt, the target engine speed Ner is derived at the step 2018.

Figure 16:
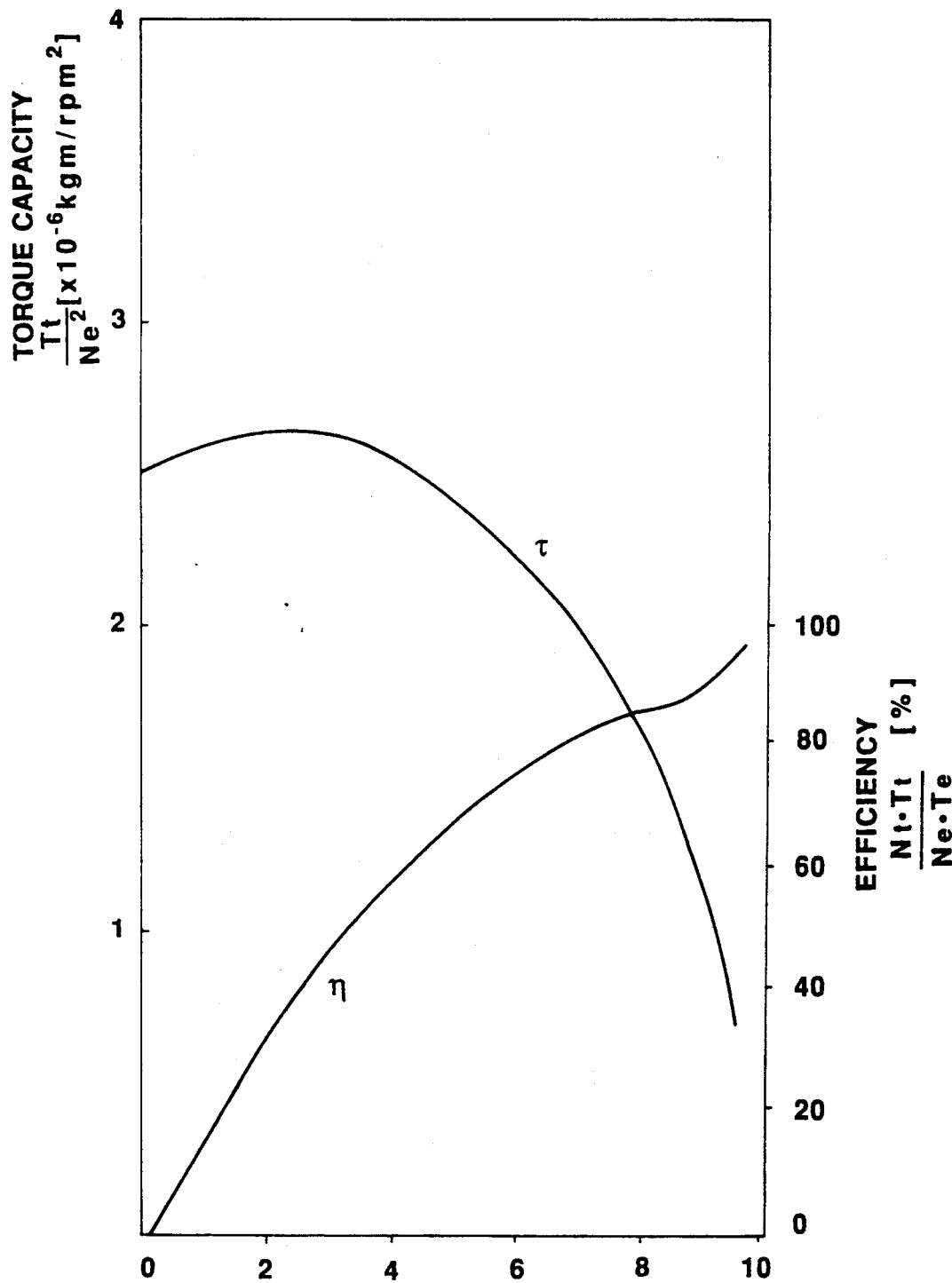
FIG. 16 is a chart showing basic characteristics of a torque converter.

As shown in FIG. 16, the characteristics of the torque converter 238 as defined by a torque capacity $\tau$ and an efficiency $\eta$, is determined depending upon an input-/output speed ratio between an input speed thereto which corresponds to the engine speed Ne and the torque converter output speed Nt. Therefore, as is well known, a model of the output torque $T_t$ at the torque converter 238 can be expressed by the following equation:

in non-coupling range:

$$T_t = A_0 \cdot Nt^2 + A_1 \cdot Nt \cdot Ne + A_2 \cdot Ne^2 \quad (17)$$

in coupling range:

$$T_t = B_0 \cdot Nt^2 + B_1 \cdot Nt \cdot Ne + B_2 \cdot Ne^2 \quad (18)$$

wherein $A_0 \sim A_2$ and $B_0 \sim B_2$ are unique constants of the specific torque converter 238.

The foregoing equation can be derived from the quadratic equation of the torque capacity $\tau (= T_t/Ne^2)$ expressed by the input/output rotation speed ratio Nt/Ne as follows:

$$T_t/Ne^2 = C_0 \cdot (Nt/Ne)^2 + C_1 \cdot Nt/Ne + C_2 \quad (19)$$

wherein $C_0 \sim C_2$ are constant showing curvature of a curve illustrating the foregoing quadratic equation.

On the other hand, the efficiency $\eta$ can be expressed by:

$$\eta = (Nt/T_t)/(Ne/T_e) \quad (20)$$

wherein $T_e$ is an input torque.

Assuming that the engine speed (target engine speed) to obtain the target torque converter output torque $T_{tr}$ is Ner, the forgoing equations (18) and (19) can be modified as:

$$T_{tr} = A_0 \cdot Nt^2 + A_1 \cdot Nt \cdot Ner + A_2 \cdot Ner^2 \quad (21)$$

Taking the target torque converter output torque $T_{tr}$ and the torque converter output speed Nt as parameters, the target engine speed Ner can be obtained by solving the simultaneous equations of the foregoing equations (21) and (22). In such case, the target engine speed Ner thus derived reflects the torque converter characteristics which is determined by the target engine output torque $T_{or}$, the transmission speed ratio Gr, the torque converter output speed Nt.

It should be appreciated that though the shown embodiment derives the target engine speed Ner through arithmetic process, it may be possible to preliminary set look-up table to be looked up in terms of the target torque converter output torque $T_{tr}$ and the torque converter output speed Nt.

Through the foregoing process, the engine output torque can be controlled corresponding to the accelerator operational magnitude even when the engine is coupled with the torque converter.

Subsequently, at a step 2020, the target engine output torque $T_{er}$ is derived utilizing the response characteristics model H(s) selected at the step 2016. In practice, the target engine output torque $T_{er}$ is determined so that the engine speed Ne becomes equal to the target engine speed Ner derived at the step 2018. In the practical process of derivation of derivation of the target engine output torque $T_{er}$ is performed utilizing known I.M.C. (Internal Model Control) Method, as explanatorily and schematically illustrated in FIG. 17. By utilizing the I.M.C. Method, model matching control system which can provide stability of the control system despite of presence of modeling error or fluctuation of parameters, can be established. Therefore, such method is quite effective for engine control which contains relatively large number of non-linear variation factors, such as combustion which leads substantial fluctuation.

Figure 17:
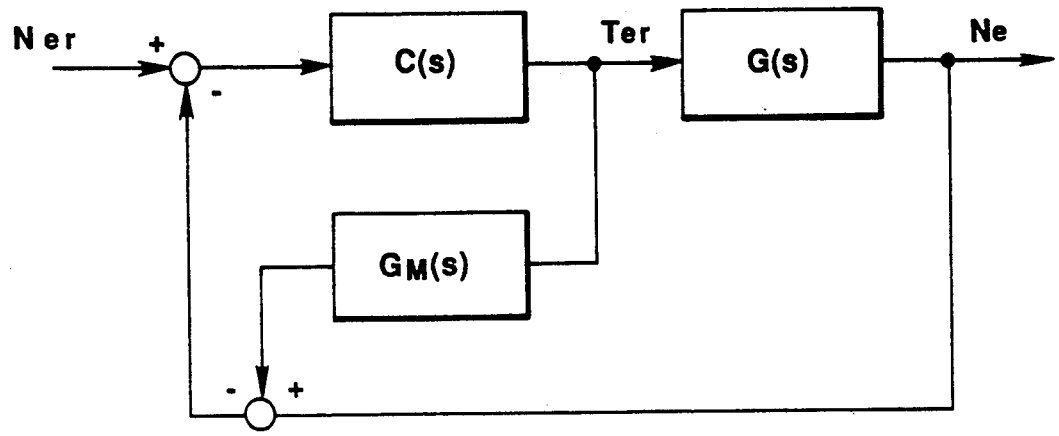
FIG. 17 is a block diagram of a circuit for converting a target engine speed into a target engine output torque.

In FIG. 17, the block G(s) represents the response characteristics in control of the throttle valve angular position for adjusting the engine output torque toward the target engine output torque, as subject of control. GM(s) represents a model of the subject of control, i.e. response characteristics of the throttle valve angular position control. C(s) represents feed-forward type model matching compensation, which can be expressed by:

$$C(s) = H(s)/GM(s) \tag{23}$$

As can be appreciated, FIG. 17 is illustrated the system for implementing the I.M.C. method in sequential time system. However, in practice, the target engine output torque $T_{er}$ is derived periodically with a sampling period T (e.g. 10 msec).

At a step 2022, based on the target engine output torque $T_{er}$ and the instantaneous engine speed Ne, the target throttle valve open angle $\theta_0$ is derived. In practice, derivation of the target throttle valve open angle $\theta_0$ is performed by way of table look-up against a target throttle open angle table 221, in which is stored the throttle open angle data in a form illustrated in FIG. 18. The table look-up is performed in terms of the target engine output torque $T_{er}$ and the instantaneous engine speed Ne against the table of FIG. 18.

Figure 18:
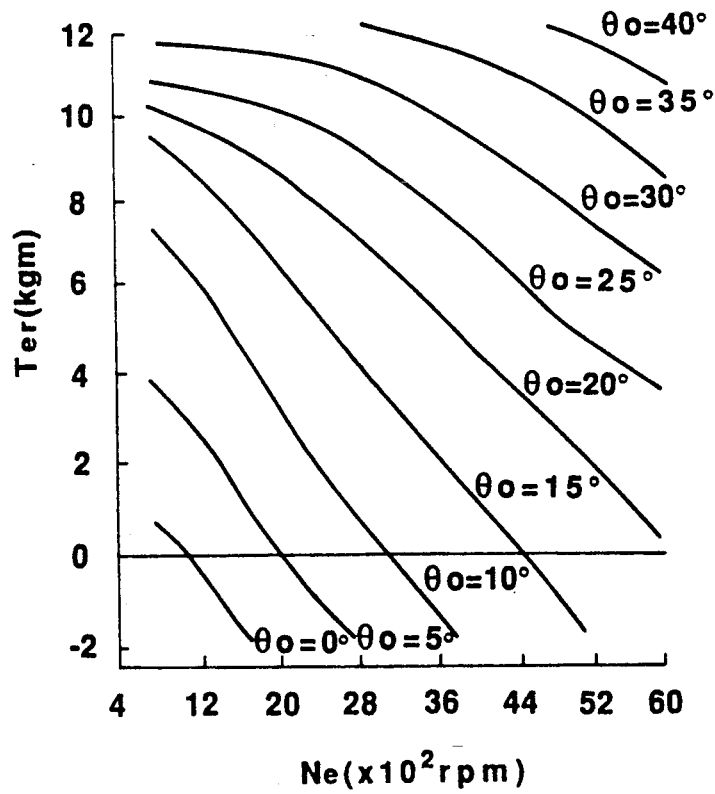
FIG. 18 is a chart showing a data table for deriving a target throttle valve open angle on the basis of the target engine output torque and an engine speed.

As can be appreciated, the characteristics of the throttle valve open angle variation as set in the table of FIG. 18 is variable depending upon the specific engine characteristics and/or performance.

At a step 2024, the target throttle valve open angle data $\theta_0$ is output to the servo drive circuit 222 for driving the servo motor 226 to adjust the actual throttle valve open angle toward the target throttle valve open angle. By adjusting the throttle valve open angle toward the target throttle valve open angle $\theta_0$, the intake air flow rate is adjusted to achieve the target engine speed Ner and whereby achieving the target engine output torque $T_{er}$.

Though the shown embodiment is discussed in concentrating the intake air flow rate control for achieving the target engine speed and the target engine output torque, the control system may also control fuel injection amount for obtaining the desired driving torque at the driven wheels.

As set for above, the shown embodiment is also applicable for adapting the engine driving condition for environmental condition, such as road surface condition and so forth. As can be appreciated, in case of the road surface condition, the road/tire friction is variable depending upon dry or wet of the road surface. Therefore, magnitude of rain R can be introduced as one of the vehicular driving environment factor. Such environmental factor may be taken into account in selection of the response characteristics model. Although a plurality of and various environmental condition defining factors may be taken into account to perform driving torque delivery for the driven wheels, the following discussion will be made in terms of response characteristics model selection depending upon rain condition which can be monitored by means of a rain sensor. As an example of the rain sensor, U.S. Pat. Nos. 4,527,105, 4,542,325, 4,584,508, and 4,603,316 respectively issued on Jul. 2, 1985, Sep. 17, 1985, Apr. 22, 1986 and Jul. 29, 1986 are herein incorporated by reference.

Figure 19:
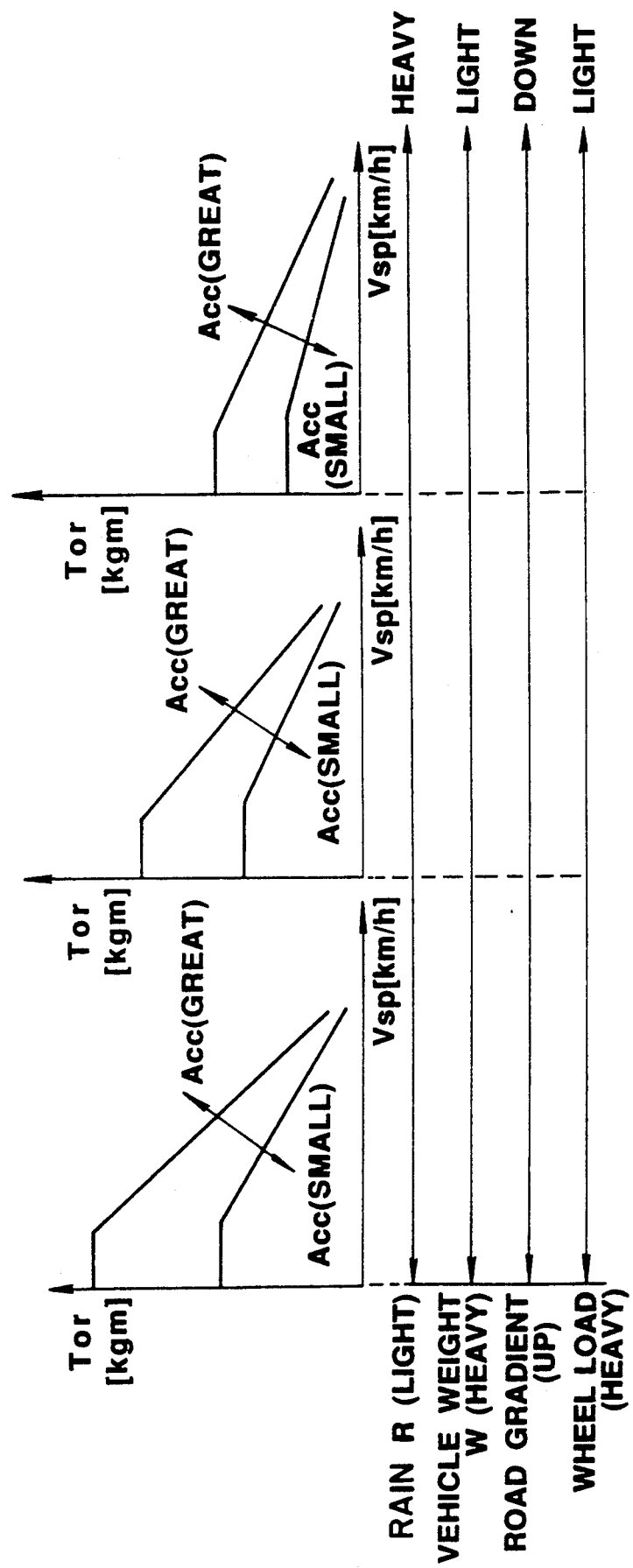
FIG. 19 is a chart showing a data table of a target driving torque depending upon vehicle driving condition.

In such case, the target driving torque $T_{or}$ is derived by way of table look-up against a look-up table illustrated in FIG. 19 in terms of the accelerator position Acc and vehicular driving condition represented by the vehicle speed Vsp and the rain condition R. As can be seen from FIG. 19, in the rainy condition, the road surface friction $\mu$ becomes low to cause unacceptably large magnitude of wheel slippage easily, therefore, the target driving torque $T_{or}$ is set at lower value than that at dry road surface condition. Though the shown embodiment employs a look-up table for deriving the target driving torque $T_{or}$, equivalent target driving torque may be arithmetically derived from the following equation:

$$T_{or} = K_1 \cdot Acc - k_2 \cdot Vsp - k_3 \cdot R \tag{24}$$

wherein $k_1 \sim k_3$ are constants.

Figure 20:
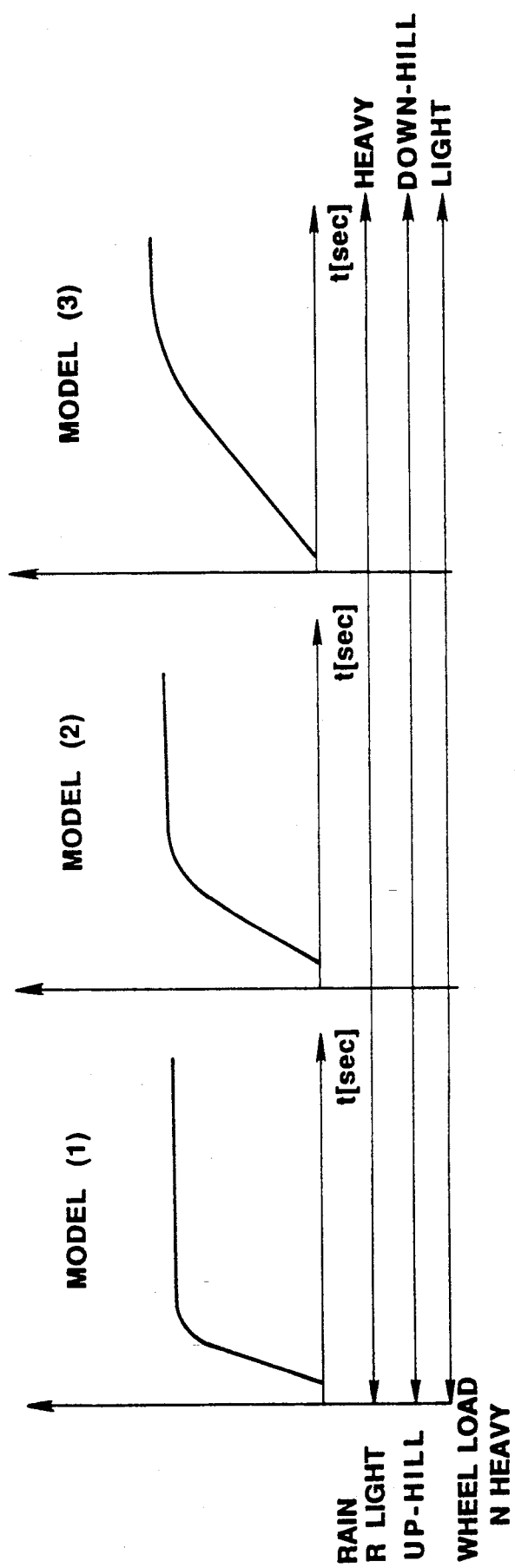
FIG. 20 is a chart showing model selection characteristics for selecting response characteristic models to be selected depending upon vehicle driving condition, such as rain conditions and so forth.

Subsequently, the response characteristics model is selected depending upon the rain condition. As shown in FIG. 20, in the shown embodiment, more moderate response characteristics for providing smaller variation rate of variation of the driving torque at heavier rain. The target driving torque $T_{or}$ thus derived is converted into the target torque converter output torque $T_{tr}$ through the similar process set forth above. The target engine speed Ner is set on the basis of the target torque converter output torque $T_{tr}$ and the torque converter output speed Nt so that the engine speed can be adjusted toward the target engine speed Ner utilizing the response characteristics selected depending up rain condition, the target engine speed. The throttle valve open angle $\theta_0$ is thus derived for adjusting the throttle valve open angle for achieving the target engine speed Ner and thus achieving the target engine output torque $T_{er}$.

As the vehicle driving condition, the vehicular load condition, i.e. passenger weight and luggage weight can be taken into account. In such case, the load condition on the vehicle may be detected by detecting stroke of relative displacement between the vehicular body and the suspension member. For detecting this, the stroke sensor as employed in the first embodiment may be useful. As can be seen from FIG. 19, in order to obtain equivalent acceleration feeling irrespective of the vehicular load condition, the response characteristics is set to set greater variation range of the target driving torque $T_{or}$ at greater vehicular load. In case, the target driving torque $T_{or}$ is to be derived arithmetically, the following equation may be used:

$$T_{or} = k_1 \cdot Acc - k_2 \cdot Vsp + k_3 \cdot W \tag{25}$$

Also, when the vehicular driving condition in up-hill and down-hill is taken to determined the response characteristics model, the road inclination $\theta s$ may be detected by means of an acceleration sensor at stable state driving. In such case, higher response characteristics is set at greater inclination magnitude of up-hill so as to unify the vehicular acceleration feeling. In such case, the following equation may be used for deriving the target driving torque:

$$T_{or} = k_1 \cdot Acc - k_2 \cdot Vsp + k_3 \cdot \theta s \tag{26}$$

Furthermore, when wheel load N is taken as parameter for selecting the response characteristics model, the wheel load sensor that employed in the first embodiment will be used. In the alternative, the wheel load may be derived arithmetically by calculating a down force based on the aerodynamic characteristics of the specific vehicle, which aerodynamic characteristics may be determined through experiments and set in the data storage memory of the control system, and the vehicle speed Vsp. As can be appreciated, the greater wheel load may establish greater traction magnitude on the wheel, higher response characteristics model can be selected at greater wheel load, as seen from FIG. 19.

Figure 21:
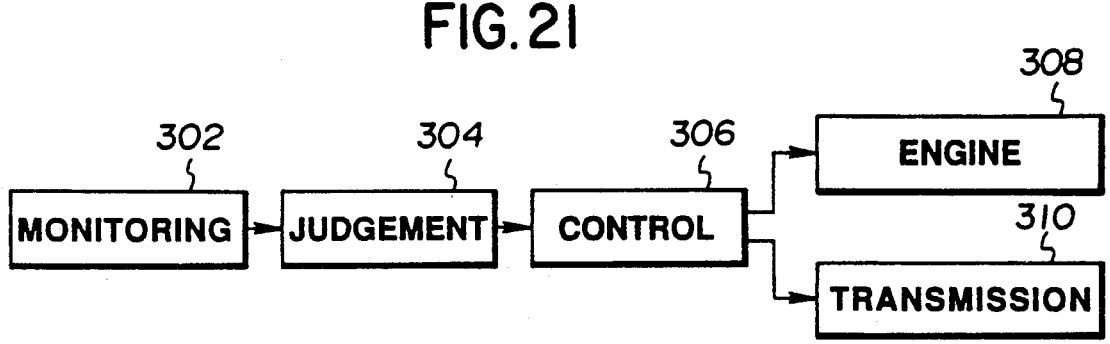
FIG. 21 is a schematic block diagram of the third embodiment of a driving torque delivery control system according to the invention, which is illustrated in a discrete manner of functions to be implemented.

FIG. 21 shows the third embodiment of a driving torque delivery control system according to the invention. FIG. 21 schematically illustrates the general construction of the third embodiment of the control system according to the invention. As can be seen, the shown embodiment is directed to selectively perform shift control of an automatic power transmission and the engine for optimally adjusting delivery of driving torque for driven wheels. For this, the shown embodiment includes a monitoring stage 302 which may be constituted of a plurality of sensors monitoring respectively preselected control parameters. Based on the monitored control parameters, a judgement is made at a stage 304 whether the transmission speed ratio or the engine output is to be adjusted for achieving an optimal driving torque at the driven wheels. Selective automatic power transmission control and engine output torque control is performed depending upon the result of judgement at a control stage 306 for controlling one of the automatic power transmission 308 or the internal combustion engine 310.

Figure 22:
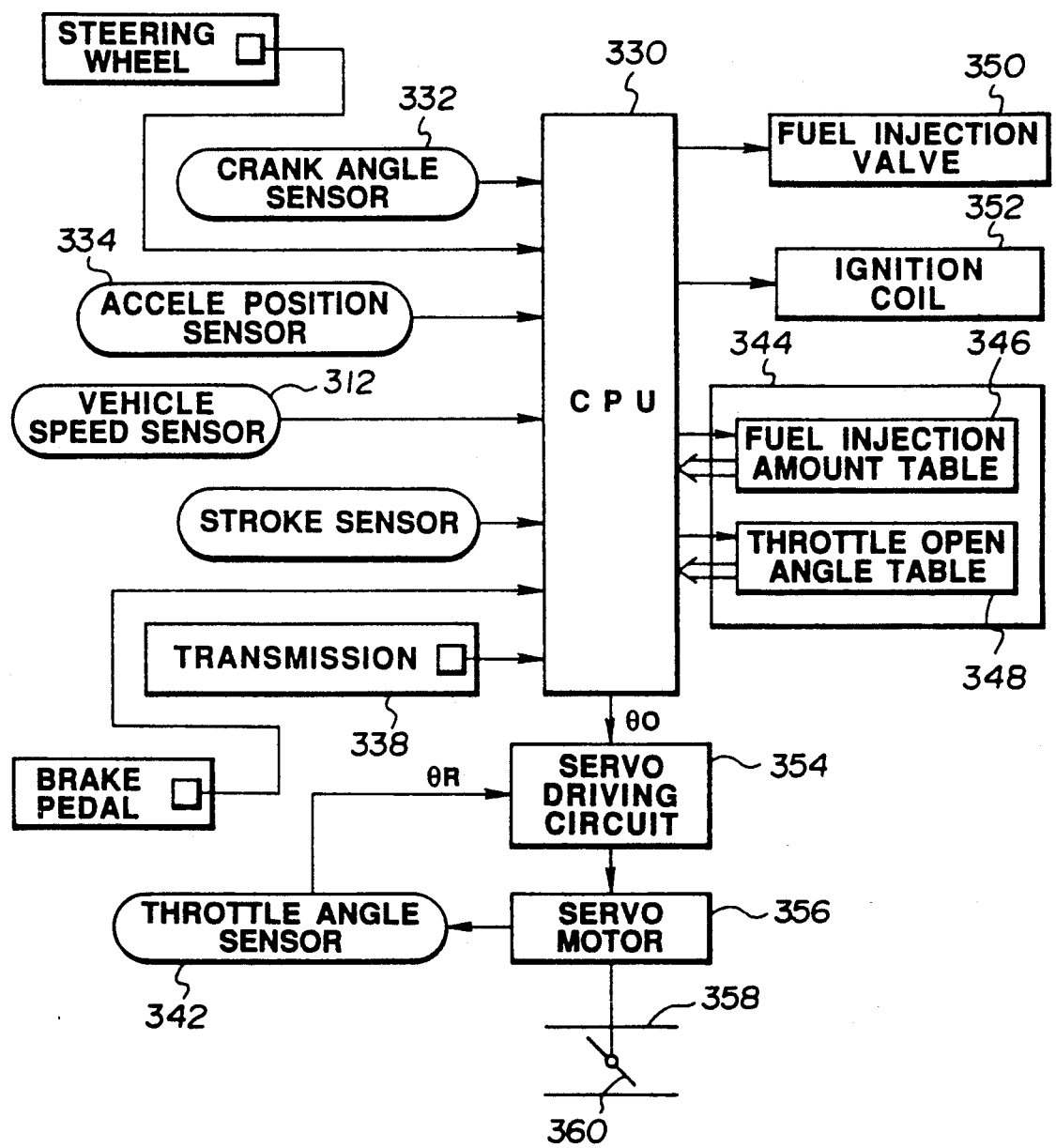
FIG. 22 is a block diagram of the third embodiment of the driving torque delivery control system showing the first preferred construction of control system.

As can be appreciated, the shown embodiment is applicable for either of the foregoing first and second embodiments as combined with a control for an automatic power transmission. As for example, FIG. 22 shows the example that the third embodiment of the control system for selectively performing the engine output torque control and the speed ratio control for the automatic power transmission. For the purpose of illustration, the wheel speed sensor and the wheel load sensor in the first embodiment seen in FIG. 2 are omitted from FIG. 22. However, these sensor may be considered to be included for performing wheel slippage dependent torque limit control.

In the construction of FIG. 22, in addition to the crank angle sensor 332, the accelerator position sensor 334, the stroke sensor 336, the transmission operational range sensor 340, the vehicle speed sensor 312, the control system is provided with a steering angle sensor 314 associated with a steering wheel 316 for monitoring steering angular displacement, and a brake switch 318 detecting depression of a brake pedal 320. The foregoing sensors are connected to CPU 330 of a microprocessor, which forms a core of the control system.

CPU 330 processes the input signals to derive a target output torque of the engine, and thus derives a fuel injection amount required for generating the target output torque. Based on the fuel injection amount thus derived, CPU 330 produces a fuel injection pulse having a pulse width corresponding to the fuel injection amount. As is well known, the fuel injection amount is derived by table look-up against a fuel injection amount table 346 stored in a data storage 344 in terms of fuel injection control parameters, e.g. engine speed, engine load and so forth. The fuel injection pulse is supplied to one or more fuel injection valves 350 disposed in an air induction system 358 of the engine to drive the latter to inject the controlled amount of fuel. At the same time, an intake air flow rate is adjusted toward a required rate by controlling the throttle valve open angle toward a target throttle valve open angle. For controlling the throttle valve open angle, the target throttle valve open angle is derived by table look-up against a throttle open angle table 348 in the data storage 344. Based on the target throttle valve open angle thus derived, a servo drive circuit 354 drives a servo motor 356 to adjust the angular position of a throttle valve 360 in the indication system 358. A throttle angle sensor 342 is associated with the servo motor 356 to detect the throttle valve angular position to provide a throttle angle signal $\theta_R$ to the servo drive circuit 354 as a feedback signal. With this arrangement, the servo drive circuit 354 drives the servo motor 356 in feedback manner to precisely adjust the throttle valve open angle to the target value.

Figure 23:
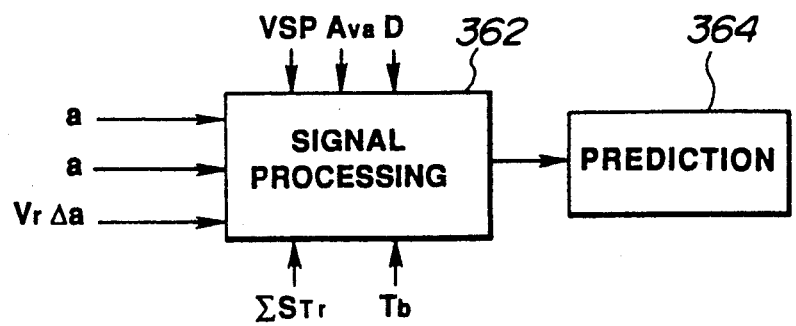
FIG. 23 is a block diagram showing a system for determining a control schedule depending upon the input control parameters.

Process of the engine output torque control is substantially the same as that illustrated in the foregoing first embodiment. Therefore, the following discussion will be concentration to selection of the engine output torque control and the transmission speed ratio control. FIG. 23 illustrates function in the CPU 330 to be performed for determining a control schedule depending upon the input control parameters. As shown, an average accelerator operational magnitude Ava which is derived by averaging the accelerator position signal a from the accelerator position sensor over a predetermined unit time, an accelerator operational speed Δa in a predetermined unit time, a running distribution VrΔa of the accelerator operational speed Δa, an integrated value of steering angular displacement ΣSTr which is derived by integrating the steering angle signal over a predetermined unit time, a braking frequency Tb which is derived by measuring and summing total application period of the brake are derived at a signal processing stage 362 together with the vehicle speed indicative signal Vsp and the accelerator position signal a. The running distribution VrΔa can be expressed by:

$$Vr\Delta a = \frac{(N-1) \cdot Vr\Delta a_{(t-1)} + (\Delta a_{(t)} - \Delta a)^2}{N} \quad (27)$$

wherein $$\Delta a_{(t)} = \frac{(M-1) \cdot \Delta a_{(t-1)} + \Delta a_{(t)}}{M}$$

wherein M and N are predetermined constants.

Furthermore, based on the target engine output torque $T_0$ and the actual average acceleration $\alpha$ of the vehicle, traveling resistance D is derived utilizing a table $f(T_0, \alpha)$. For instance, the traveling resistance may be derived from the accelerator operational magnitude at the vehicle traveling condition where the vehicular acceleration is zero. In the alternative, the traveling resistance D on a flat road can be derived from the vehicular weight and the engine output torque.

The average accelerator operational magnitude Ava, the accelerator operational speed Δa, the running distribution VrΔa of the accelerator operational speed Δa, the integrated value of steering angular displacement ΣSTr, the braking frequency Tb are supplied to a fuzzy predicting stage 364. In the fuzzy predicting stage 364, the supplied data are processed for discriminating the vehicular driving condition for making judgement whether higher priority of control is given for the transmission speed ratio control or for the engine output torque control. For enabling this, membership functions may be stored in the data storage 344. Process of predicting the vehicle driving condition and making judgement for which controls is to be given higher priority, will be discussed herebelow.

As an example, discussion will be given for selection of controls based on the membership function associated with the accelerator operational speed Δa. As shown by solid line in FIG. 24(a), an input side membership function representative of the predicted transmission control demand can be set greater fuzzy value for transmission speed ratio control when the accelerator operational speed Δa is relatively high based on the judgement that the driver is demanding swift acceleration of the vehicle and thus requires greater torque to be delivered to the driven wheels. This is because that in case of the engine output torque control, there should be a lag time in increasing the output torque. On the other hand, as shown by broken line in FIG. 24(a), an input side membership function representative of the predicted engine output torque control demand can be set at greater fuzzy value when the accelerator operational speed Δa is relatively low. This is because that low accelerator operational speed Δa represents low demand of the driver for swift acceleration. In this case, it is preferable to avoid frequent transmission speed ratio shifting operation for assuring better driving comfort.

Figure 24A:
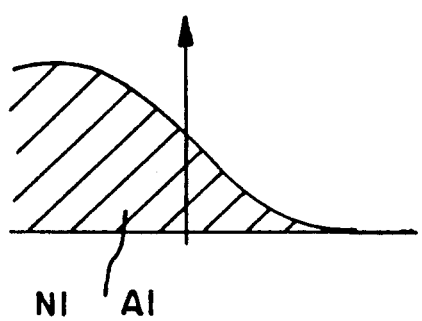
FIGS. 24 to 39 are charts showing membership functions employed in the third embodiment of the control system.
Figure 24B:
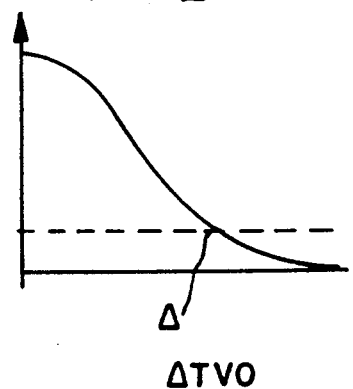

Then, utilizing FIG. 24(b), the predicted degree of demand for the transmission speed ratio control is derived as an area (or integrated value). Similarly, utilizing FIG. 24(c), the predicted degree of demand for the engine output torque control is derived as an area. A centroid of the logical sum (OR) is then derived with the areas respectively representing the predicted degree of demands for the transmission speed ratio control and the engine output torque control. When the centroid thus derived is offset toward the side of transmission speed ratio control, judgement can be made that priority is to be given for transmission speed ratio control. Similarly, when the centroid is offset toward the side of the engine output torque control, judgement can be made that priority is to be given for the engine output torque control.

Figure 24C:
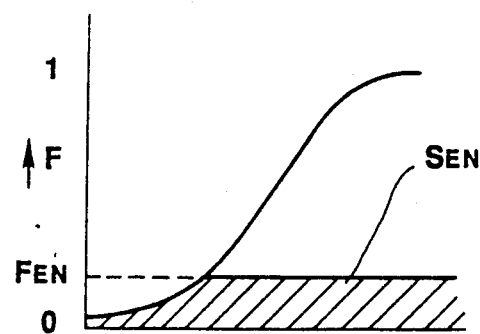
Figure 25:
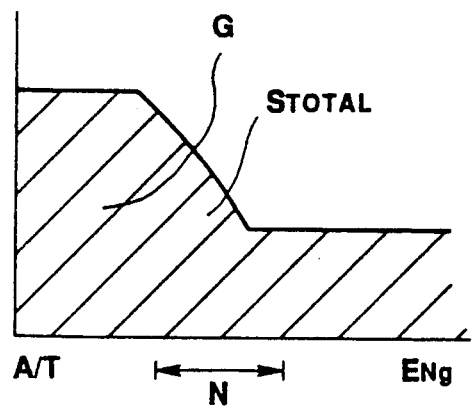

In the example illustrated in FIG. 24(a), assuming that the accelerator operational speed Δa resides at the point A, the fuzzy value $F_{AT}$ representing predicted degree of demand for the transmission speed ratio control, and the fuzzy value $F_{EN}$ representing the predicted degree of demand for the engine output torque control are derived. Based on the fuzzy value $F_{AT}$, the area $S_{AT}$ is derived as shown in FIG. 24(b). Simultaneously, the area $S_{EN}$ is derived based on the fuzzy value $F_{EN}$ as shown in FIG. 24(c). Then, as shown in FIG. 25, by obtaining logical sum of the areas $S_{AT}$ and $S_{EN}$, a sum area $S_{total}$ is established. Then, the centroid G of the sum area $S_{total}$ is derived. In the shown example, the centroid G is offset toward the side of the transmission speed ratio control (A/T), judgement can be made that the transmission speed ratio control is given higher priority than the engine output torque control.

As can be seen from FIG. 25, the shown example has a deadband zone N. When the centroid is placed within the deadband zone, the control is maintained unchanged for avoiding hunting of switching of the control.

Figure 26:
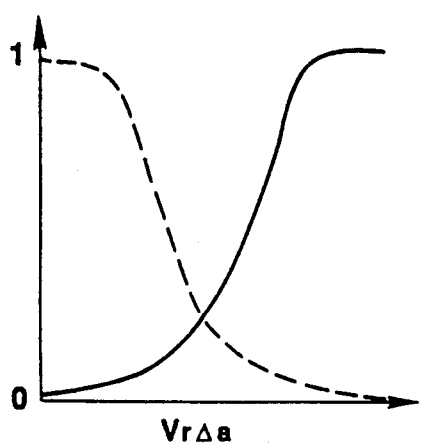
Figure 27:
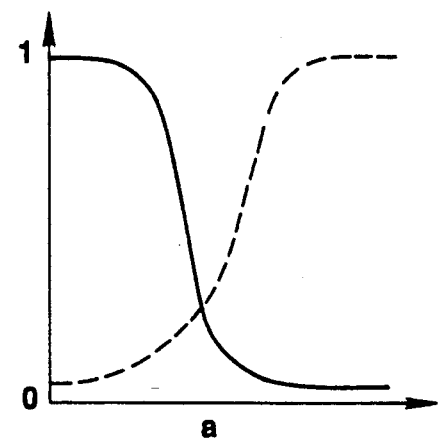

In case of selection of the transmission speed ratio control and the engine output torque control on the basis of a membership function associated with the running distribution VrΔa of the accelerator operational magnitude a and the average accelerator position Ava. The membership function is set greater fuzzy value representing predicted demand for the engine output torque control when the running distribution VrΔa is great and the average accelerator position Ava is small, as shown by solid lines in FIGS. 26 and 27. The membership functions in FIGS. 26 and 27 is set for unnecessary shifting of the transmission speed ratio. Namely, since the shifting point of the transmission speed ratio is determined according to the vehicle speed Vsp and the accelerator operational position a. Therefore, great running distribution VrΔa and small average accelerator position Ava represent frequent variation of the accelerator operational position. Therefore, when transmission speed ratio control is given higher priority than the engine output torque control, frequent shifting of the transmission speed ratio is caused to cause degradation of the vehicular drivability.

On the other hand, when the running distribution VrΔa is small and the average accelerator position Ava is great, judgement can be made that the vehicle is cruising at relatively high speed. In such case, in order to satisfy acceleration demand, it is preferred to set the membership function given greater fuzzy value representing the predicted demand for the transmission speed ratio, as shown by broken line in FIGS. 26 and 27.

Figure 28:
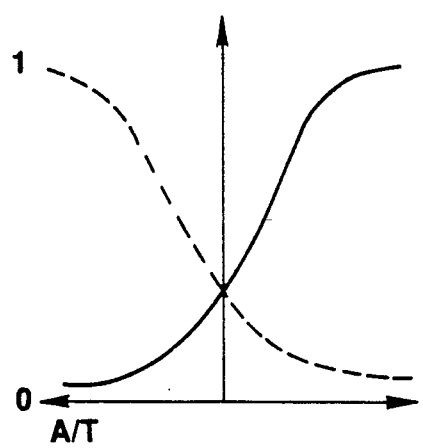

In such case, by utilizing FIG. 28, the area representing the degree of the predicting demand for the engine control is defined by the solid line and the area representing the degree of the predicted demand for the transmission speed ratio control is defined by the broken line. With the logical sum (OR) of both area, the centroid is derived for providing higher priority for one of the transmission speed ratio control and the engine output torque control depending upon offsetting direction of the centroid relative to the center.

Figure 29:
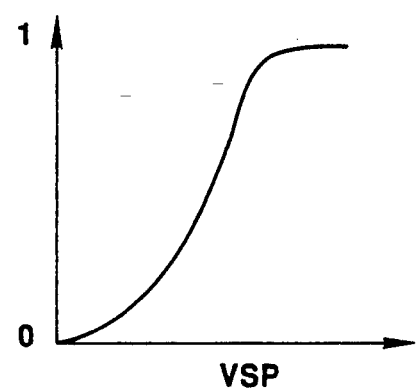
Figure 30:
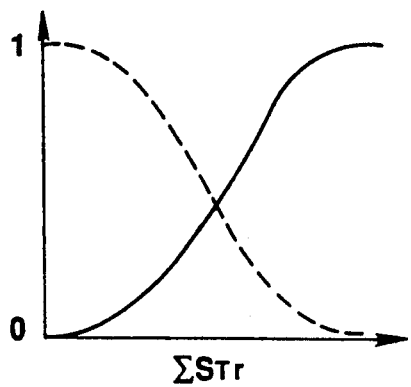

In case that the selection of the transmission speed ratio control and the engine output torque control is performed based on the membership function associated with the average vehicle speed VSP and the steering frequency $\Sigma S_{Tr}$, membership function is set as shown in FIGS. 29 and 30. When the average vehicle speed VSP is higher than a predetermined speed (medium speed), and the steering frequency $\Sigma S_{Tr}$ is great, it is preferred to prevent abrupt torque variation during steering operation. Therefore, higher priority is given for the membership function by giving great fuzzy value representing the greater demand for engine output torque control, as shown by solid lines in FIGS. 29 and 30.

Figure 31:
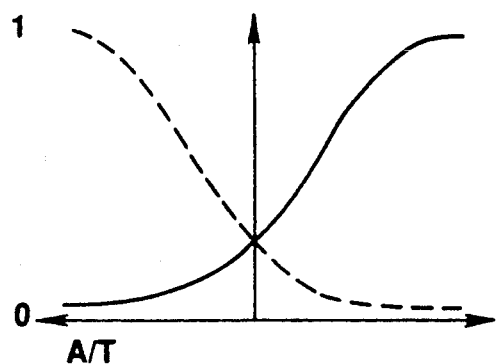

In such case, by utilizing FIG. 31, the area representing the degree of the predicting demand for the engine control is defined by the solid line and the area representing the degree of the predicted demand for the transmission speed ratio control is defined by the broken line. With the logical sum (OR) of both area, the centroid is derived for providing higher priority for one of the transmission speed ratio control and the engine output torque control depending upon offsetting direction of the centroid relative to the center.

Figure 32:
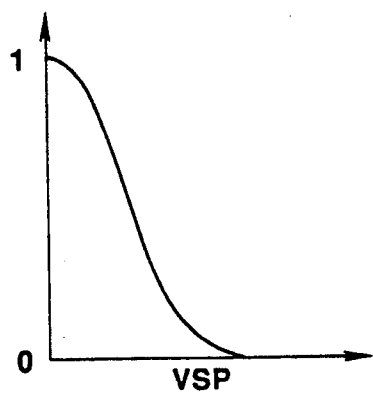
Figure 33:
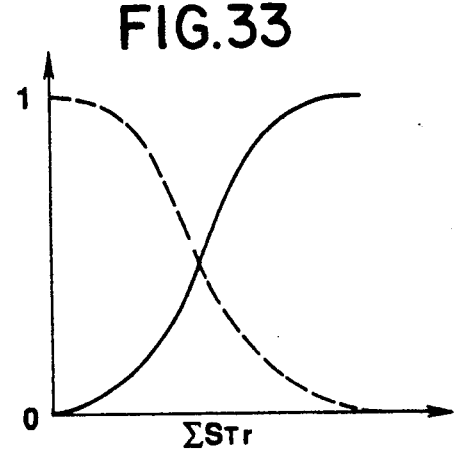

On the other hand, when the average vehicle speed VSP is higher than the predetermined speed and the steering frequency $\Sigma S_{Tr}$ is low, judgement can be made that the vehicle is going straight at relatively high speed. Therefore, as set out above, higher acceleration characteristics is desired. In such case, the membership function is set to have a greater fuzzy value representing greater predicting demand for the engine output torque control, as shown in FIGS. 32 and 33.

On the other hand, when the average vehicle speed VSP is substantially low and the steering frequency $\Sigma S_{Tr}$ is great, judgement can be made that the vehicle is driven for parking or so forth. In such case, abrupt torque variation is not preferred. Therefore, in such case, the membership function is set to have a greater fuzzy value representing greater predicting demand for the engine output torque control, as shown by broken line in FIGS. 32 and 33. However, even when the average vehicle speed VSP is substantially low, if the steering frequency $\Sigma S_{Tr}$ is low, the membership functions set to have greater fuzzy value representing greater predicted demand for the transmission speed ratio control.

Figure 34:
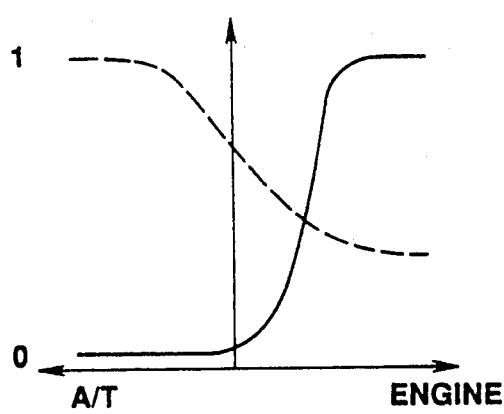

In such case, by utilizing FIG. 34, the area representing the degree of the predicting demand for the engine control is defined by the solid line and the area representing the degree of the predicted demand for the transmission speed ratio control is defined by the broken line. With the logical sum (OR) of both area, the centroid is derived for providing higher priority for one of the transmission speed ratio control and the engine output torque control depending upon offsetting direction of the centroid relative to the center.

Figure 35:
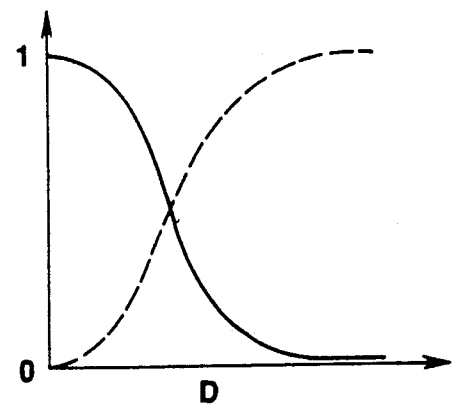

In case of the membership function is set in relation to the vehicular traveling resistance D, smaller vehicular traveling resistance D results in greater fuzzy value for selection of the transmission speed ratio control, as shown in FIG. 35. A typical situation of the smaller vehicular traveling resistance should be down-hill driving. In this case, it may be preferred to effectively effect the engine braking. In this view, higher priority for the transmission speed ratio control can be preferred. On the other hand, when the vehicular traveling resistance is high, greater fuzzy value for selection of the engine output torque control. Typical situation of the greater traveling resistance is hill climbing. In such case, if the transmission speed ratio control is given high priority, the transmission may fall into busy shift condition. To prevent this, it is preferred to give higher priority for the engine output torque control.

Figure 36:
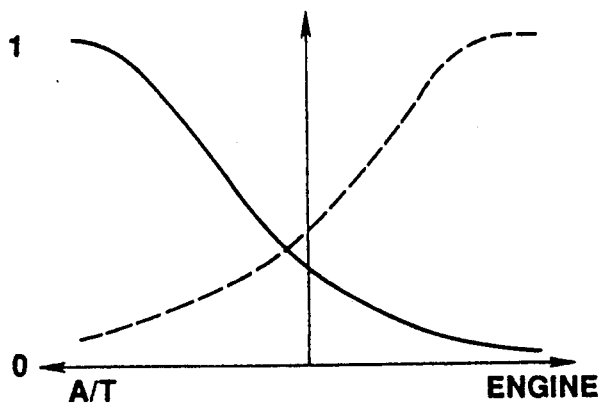
Figure 37:
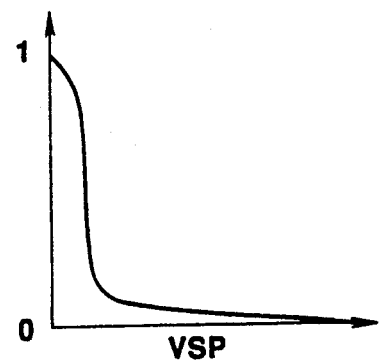
Figure 38:
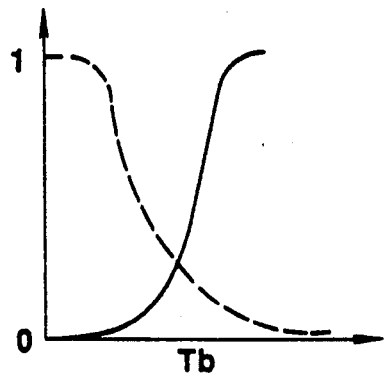
Figure 39:
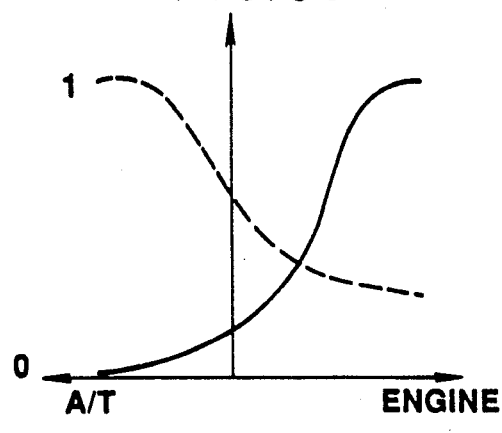

In such case, by utilizing FIG. 36, the area representing the degree of the predicting demand for the engine control is defined by the solid line and the area representing the degree of the predicted demand for the transmission speed ratio control is defined by the broken line. With the logical sum (OR) of both area, the centroid is derived for providing higher priority for one of the transmission speed ratio control and the engine output torque control depending upon offsetting direction of the centroid relative to the center.

In case that the control selection is performed based on the average vehicle speed VSP and the braking frequency $T_b$, greater fuzzy value is given for the predicted demand for the engine output torque control when the vehicle speed VSP is low and the braking frequency $T_b$ is high, as shown by the solid line in FIG. 43. In such situation, judgement can be made that the vehicle is traveling in a traffic jam or so forth. Therefore, in such condition, the transmission speed ratio control if given higher priority may cause frequent shifting to degrade vehicular drivability. Therefore, it is preferred to give higher priority for the engine output torque control. On the other hand, when the average vehicle speed VSP is low and the braking frequency $T_b$ is also low, higher priority may be given for the transmission speed ratio control, as shown in FIG. 43.

In such case, by utilizing FIG. 44, the area representing the degree of the predicting demand for the engine control is defined by the solid line and the area representing the degree of the predicted demand for the transmission speed ratio control is defined by the broken line. With the logical sum (OR) of both area, the centroid is derived for providing higher priority for one of the transmission speed ratio control and the engine output torque control depending upon offsetting direction of the centroid relative to the center.

In practice, selection of the transmission speed ratio control and the engine output torque control can be performed through the process as illustrated in FIG. 45.

At a step 3202, the accelerator position indicative signal a and the average accelerator operational speed Δa, the running distribution VrΔa, and the steering frequency $\Sigma S_{Tr}$ and so forth are input. Then, fuzzy prediction through the foregoing process is performed at a step 3204. Based on the result of the fuzzy prediction at the step 3204, discrimination is made which of the transmission speed ratio control and the engine output torque control is to be selected, at a step 3026. If selected control is transmission speed ratio control, check is performed whether demand for shifting the speed ratio exists, at a step 3028. Otherwise, check is performed whether demand for controlling the engine output torque is exists, at a step 3030. If not, process directly goes END. On the other hand, of yes, command for maintaining the instantaneous condition is output at a step 3032.

On the other hand, when the engine output torque control is selected at the step 3026, check is performed if the engine output torque control demand is exist at a step 3034. If yes, the engine output torque control is performed at a step 3036. On the other hand, if the engine output torque control demand does exist, check is performed whether demand for transmission speed ratio control exists, process goes to the step 3032, and otherwise process directly goes END.

In the process at the step 3032, the process temporarily stops at wait mode for about 10 sec. so that the command for maintaining the current condition is to be output after expiration of a predetermined period, e.g. 10 sec.

While the present invention has been discussed hereabove in terms of the preferred embodiment of the invention, the invention should not be limited or specified to the specific embodiments set forth above. The invention should be interpreted to include all embodiments and modifications which can be implemented without departing from the principle of the invention in the appended claims.

Figure 41:
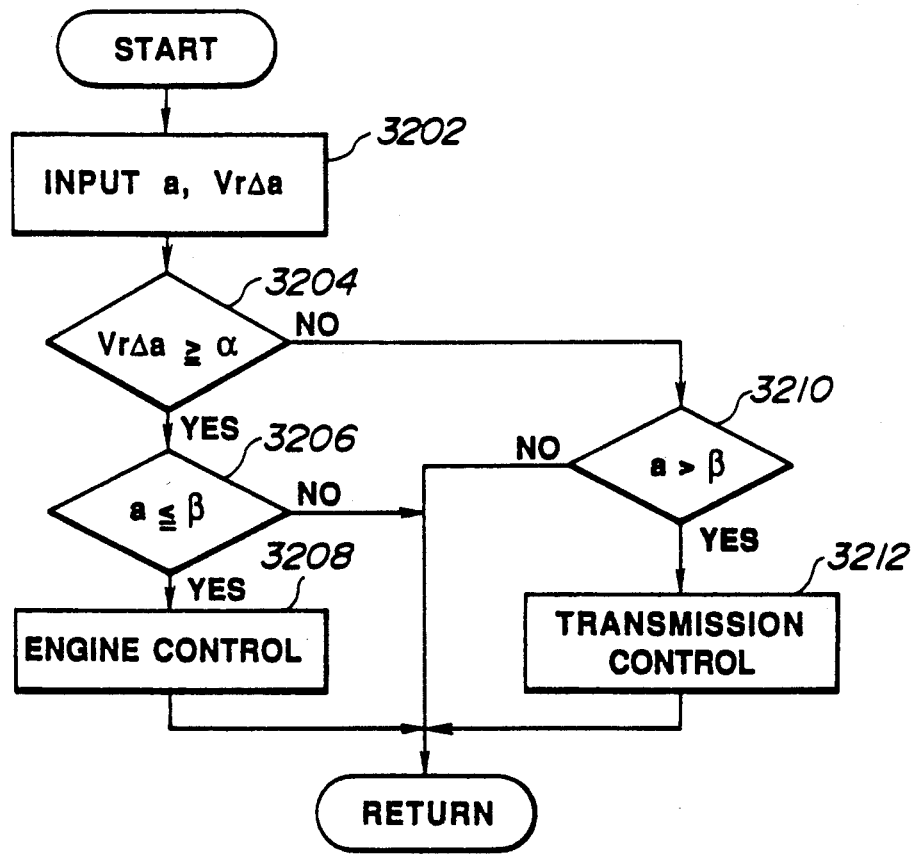
FIG. 41 is a flowchart showing a process of control in a pattern-trigger type control.

For instance, although the foregoing embodiment employs the fuzzy control in selecting one of the transmission speed ratio control and the engine output torque control, it is possible to establish patterns for respective parameters to perform selection without using fuzzy prediction. FIG. 41 illustrates one example of the process for selection of the transmission speed ratio control and the engine output torque control. At a step 3202, the accelerator position data a and the running distribution data VrΔa are input and read out. Then, at a step 3204, the running distribution data VrΔa is compared with a predetermined value α. If the running distribution data VrΔa is greater than or equal to the predetermined value α, the accelerator position data a is compared with a predetermined value β, at a step 3206. If the accelerator position data a is smaller than or equal to the predetermined value β, selection of the engine output torque control is made at a step 3208. On the other hand, when the accelerator position data a is greater than the predetermined value β as checked at the step 3206, process directly goes END. On the other hand, when the running distribution VrΔa as checked at the step 3204 is smaller than the predetermined value α, the accelerator position data a is compared at a step 3210 with the predetermined value β. If the accelerator position data a is greater than the predetermined value β, then the transmission speed ratio control is selected at a step 3212. Otherwise process directly goes END.

As can be naturally understood, in order to establish the process of FIG. 41, it is of course possible to introduce additional parameters, such as the average vehicle speed VSP, the steering angular position, and the vehicular traveling resistance.

It should be appreciated that though the third embodiment of torque the control system has been illustrated in combination with the torque demand dependent engine output torque control, the process set out above may be applicable for any time of engine control as combined with shift control of an automatic power transmission, for obtaining optimal vehicular driving performance.

What is claimed is:

1. A control system for controlling distribution of a driving torque derived from a vehicular engine to driven wheels, comprising:
    first means for manually entering a torque demand for the driving torque to be distributed into the driven wheels for controlling vehicular traveling behavior, said first means generating an engine torque demand indicative signal;
    second means for monitoring an engine revolution speed for producing an engine speed indicative signal;
    third means for deriving a target engine output torque on the basis of said engine torque demand indicative signal and said engine speed indicative signal;
    fourth means for detecting a vehicle running condition based on a preselected vehicle driving parameter which affects a conversion of the engine output torque into a thrust force which forces the vehicle to travel, for deriving a correction factor for said target engine output torque on the basis of the detected vehicular running condition, and modifying said target engine output torque on the basis of said correction factor; and
    fifth means for controlling engine driving condition for adjusting the engine speed to change an engine output torque which coincides with the modified target engine output torque.

2. A control system as set forth in claim 1, wherein said fourth means monitors wheel slippage and derives said correction factor which represents a maximum driving torque applicable for a driven wheel for driving the wheel while maintaining wheel slippage within a predetermined acceptable range.

3. A control system as set forth in claim 2, wherein said fourth means includes a wheel speed sensor for monitoring wheel speed of the driven wheel, a wheel torque calculating means for monitoring driving torque at said driven wheel, a vehicle speed sensor for monitoring vehicular traveling speed, means for deriving angular acceleration of the wheel on the basis of monitored wheel speed of said driven wheel, means for deriving a dynamic friction coefficient on the basis of said driving torque on said driven wheel and said angular acceleration at said driven wheel, and a wheel slippage based on said vehicle speed and said wheel speed of said driven wheel.

4. A control system as set forth in claim 3, wherein said fourth means further comprises means for deriving a maximum dynamic friction on the basis of dynamic friction at each driven wheel and said wheel slippage at each driven wheel, and means for deriving a limit of driving torque to be distributed to each driven wheel as said correction factor on the basis of said maximum dynamic friction.

5. A control system as set forth in claim 1, wherein said fourth means monitors status of a power train for transmitting the engine output torque to said driven wheels for deriving a driving torque transmission characteristic, said fourth means deriving a target driving torque to be distributed to said driven wheels and deriving a ratio between the engine output torque and the driving torque distributed to said driven wheels as said correction factor for modifying said target engine output torque so that the driving torque to be distributed to said driven wheels is controlled to said target driving torque.

6. A control system as set forth in claim 5, wherein said fourth means detects a transmission speed ratio and an input/output speed ratio at a torque converter for deriving said ratio of said engine output torque and said driving torque.

7. A control system as set forth in claim 6, which further comprises a sixth means for setting engine response characteristics depending upon vehicle driving condition for adjusting an engine speed variation ratio there along.

8. A control system as set forth in claim 7, wherein said sixth means monitors vehicular steering condition for setting said engine response characteristics depending thereon.

9. A control system as set forth in claim 7, wherein said sixth means monitors rain condition for setting said engine response characteristics based thereon.

10. A control system as set forth in claim 7, wherein said sixth means monitors vehicular load condition for setting said engine response characteristics based thereon.

11. A control system as set forth in claim 7, wherein said sixth means detects gradient of road for setting said engine response characteristics based thereon.

12. A control system as set forth in claim 7, wherein said sixth means detects a load of said driven wheels for setting said engine response characteristics based thereon.

13. A control system as set forth in claim 1, which further comprises a sixth means for controlling a speed ratio of an automotive automatic power transmission, and a seventh means for monitoring a vehicle driving condition for selectively initiating said engine output torque control and said transmission speed ratio control dependent upon the vehicle driving condition.

14. A control system as set forth in claim 13, wherein said seventh means predicts demand for vehicular behavior based on the vehicle driving condition for selecting one of said engine output torque control and said transmission speed ratio control, wherein the one selected is the one having greater demand.

15. A control system as set forth in claim 14, wherein said seventh means derives an assurance level representative data for predicting magnitude of demand for the engine output torque control and said transmission speed ratio control, which assurance level representative data is derived on the basis of the vehicle driving condition, and said seventh means selects one of said engine output torque control and said transmission speed ratio control, wherein the one selected is the one having greater assurance level indicative data.

16. A control system as set forth in claim 15, wherein said sixth means monitors at least one of an accelerator operational magnitude, an average vehicle speed, a vehicle traveling resistance, a vehicular steering condition, or a braking frequency.

* * * * *